United States Patent
Baldwin et al.

(10) Patent No.: US 10,975,178 B2
(45) Date of Patent: Apr. 13, 2021

(54) PRODUCTION OF CIS-1,4-POLYDIENES WITH MULTIPLE SILANE FUNCTIONAL GROUPS PREPARED BY IN-SITU HYDROSILYLATION OF POLYMER CEMENT

(71) Applicant: Bridgestone Corporation, Chuo-ku (JP)

(72) Inventors: Steven M. Baldwin, Akron, OH (US); Walter A. Salamant, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 89 days.

(21) Appl. No.: 16/329,979

(22) PCT Filed: Sep. 1, 2017

(86) PCT No.: PCT/US2017/049867
§ 371 (c)(1),
(2) Date: Mar. 1, 2019

(87) PCT Pub. No.: WO2018/045291
PCT Pub. Date: Mar. 8, 2018

(65) Prior Publication Data
US 2019/0211120 A1    Jul. 11, 2019

Related U.S. Application Data

(60) Provisional application No. 62/383,093, filed on Sep. 2, 2016.

(51) Int. Cl.
| | | |
|---|---|---|
| *C08F 36/04* | (2006.01) | |
| *C08F 4/06* | (2006.01) | |
| *B60C 1/00* | (2006.01) | |
| *C08C 19/25* | (2006.01) | |
| *C08G 77/20* | (2006.01) | |
| *C08L 15/00* | (2006.01) | |
| *C08F 136/06* | (2006.01) | |
| *C08K 5/5419* | (2006.01) | |

(52) U.S. Cl.
CPC .............. *C08F 36/04* (2013.01); *B60C 1/00* (2013.01); *B60C 1/0016* (2013.01); *B60C 1/0025* (2013.01); *C08C 19/25* (2013.01); *C08F 4/06* (2013.01); *C08F 136/06* (2013.01); *C08G 77/20* (2013.01); *C08K 5/5419* (2013.01); *C08L 15/00* (2013.01); *C08F 2410/01* (2013.01)

(58) Field of Classification Search
None
See application file for complete search history.

(56) References Cited

U.S. PATENT DOCUMENTS

| | | |
|---|---|---|
| 4,587,276 A | 5/1986 | Lien et al. |
| 4,803,244 A | 2/1989 | Umpleby |
| 4,845,153 A | 4/1989 | Fontanille et al. |
| 5,672,660 A | 9/1997 | Medsker et al. |
| 5,810,705 A | 9/1998 | Mimura et al. |
| 6,271,309 B1 | 8/2001 | Roberts et al. |
| 6,313,205 B1 | 11/2001 | Chiron et al. |
| 6,930,147 B1 | 8/2005 | Nakagawa et al. |
| 6,972,309 B1 | 12/2005 | Wideman et al. |
| 7,351,762 B2 | 4/2008 | Ajbani et al. |
| 7,655,728 B2 | 2/2010 | Nadella et al. |
| 7,951,871 B2 | 5/2011 | Blok et al. |
| 8,653,170 B2 | 2/2014 | Nadella et al. |
| 8,980,392 B2 | 3/2015 | Guy et al. |
| 9,481,795 B2 | 11/2016 | Uhl et al. |
| 10,179,827 B2 | 1/2019 | Matmour |
| 2008/0315148 A1 | 12/2008 | Adler et al. |
| 2009/0292043 A1* | 11/2009 | Kurazumi ............... B60C 1/00 523/152 |
| 2010/0317818 A1 | 12/2010 | Hogan et al. |
| 2011/0146877 A1 | 6/2011 | Tanaka et al. |
| 2012/0165484 A1 | 6/2012 | Luo |
| 2012/0309906 A1 | 12/2012 | Hogan et al. |
| 2014/0371383 A1 | 12/2014 | Hayata et al. |
| 2016/0369015 A1 | 12/2016 | Doring et al. |
| 2017/0204256 A1 | 7/2017 | Labrunie et al. |

FOREIGN PATENT DOCUMENTS

| | | |
|---|---|---|
| EP | 1013710 A1 | 6/2000 |
| EP | 2266819 A1 | 12/2010 |
| EP | 2470574 A2 | 7/2012 |
| JP | 2004035695 A | 2/2004 |
| JP | 3681412 B2 | 8/2005 |
| JP | 4302272 B2 | 7/2009 |
| JP | 2012107141 A | 6/2012 |
| JP | 2013-502508 * | 1/2013 |
| JP | 2013245247 A | 12/2013 |
| JP | 2010168528 A | 8/2019 |

OTHER PUBLICATIONS

International Search Report and Written Opinion, dated Oct. 24, 2017 for PCT/US2017/049867, pp. 1-12.
Office Action dated Jul. 14, 2020 in corresponding Japanese Application No. 2019-512259 (with partial English translated Abstract).

* cited by examiner

*Primary Examiner* — Tae H Yoon
(74) *Attorney, Agent, or Firm* — Meredith E. Hooker; Arthur M. Reginelli

(57) ABSTRACT

A method of preparing a silane-functionalized polymer, the method comprising: preparing a polymerization system including a cis-1,4-polydiene by introducing a lanthanide-based catalyst and a conjugated diene monomer; and adding a hydrosilane compound to the polymerization system including a cis-1,4-polydiene.

20 Claims, No Drawings

PRODUCTION OF CIS-1,4-POLYDIENES WITH MULTIPLE SILANE FUNCTIONAL GROUPS PREPARED BY IN-SITU HYDROSILYLATION OF POLYMER CEMENT

This application is a National-Stage Application of PCT/US2017/049867 filed on Sep. 1, 2017, which claims the benefit of U.S. Provisional Application Ser. No. 62/383,093 filed on Sep. 2, 2016, which are incorporated herein by reference.

FIELD OF THE INVENTION

Embodiments of the invention relate to silane-functionalized polymers prepared by a process that includes reacting a cis-1,4-polydiene that includes some 1,2-linkage content with a hydrosilane compound in the presence of a lanthanide-based catalyst system.

BACKGROUND OF THE INVENTION

It is common in the rubber industry, such as the tire industry, to reinforce rubber compositions with particulate filler. Among the advantages of doing so, the particulate filler can bolster the modulus of the rubber composition. For example, silica has advantageously been employed as a filler. The use of silica filler within tire treads produces, among other advantages, improved wear.

While fillers offer advantages in rubber compositions, the presence of the filler impacts the dynamic properties of the rubber compositions. Namely, hysteretic loss increases with filler concentration. This can be disadvantageous, especially in tire treads, because hysteretic loss is inversely proportional to rolling resistance.

It is known that polymers can be modified with certain functionalities that react or interact with filler and thereby reduce hysteretic loss. Suitable functionalities that may react or interact with filler include silane functionalities. Current strategies for the incorporation of a silane functionality into a polymer include either the chain-end functionalization of an anionically-initiated polymer or the hydrosilation of a polymer chain. While the foregoing approaches have been useful, the use anionic polymerization results in a polymer with limited 1,4-cis linkage and a single silane functionality at one terminus of the polymer chain. And, the hydrosilation techniques that have been employed thus far use a finished polymer that is then redissolved in a solvent prior to the functionalization reaction with a silane using a either a platinum or a rhodium catalyst to drive the hydrosilation reaction.

SUMMARY OF THE INVENTION

One or more embodiments of the present invention provide a method of preparing a silane-functionalized polymer, the method comprising combining (i) a cis-1,4-polydiene, (ii) a hydrosilane compound, and (iii) a lanthanide-based catalyst.

Other embodiments of the present invention provide a method of A method of preparing a silane-functionalized polymer, the method comprising (i) preparing a polymerization system including a cis-1,4-polydiene by introducing a lanthanide-based catalyst and a conjugated diene monomer; and (ii) adding a hydrosilane compound to the polymerization system including a cis-1,4-polydiene.

Other embodiments of the present invention also provide a functionalized polymer defined by the formula:

where x is an integer from 0 to 3, each R is individually a halogen atom or a monovalent organic group, or where two or more R groups join to form a polyvalent organic group, and π is a cis-1,4-polydiene polymer chain that has a cis-1,4-linkage content that is greater than 60%.

Other embodiments of the present invention also provide a functionalized polymer defined by the formula:

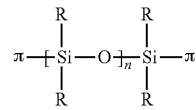

where n is an integer from 0 to 8, each R is individually a hydrogen atom, halogen atom, or a monovalent organic group, and each π is a cis-1,4-polydiene polymer chain that has a cis-1,4-linkage content that is greater than 60%.

DETAILED DESCRIPTION OF ILLUSTRATIVE EMBODIMENTS

Embodiments of the invention are based, at least in part, on the discovery of a method for producing silane-functional cis-1,4-polydiene polymer. According to aspects of the invention, cis-1,4-polydienes may be silane-functionalized by combining a polymer, including reactive polymers, with hydrosilane compound in the presence of a lanthanide-based catalyst system. As a result, the functionalized polymer includes silane-functionalization. Advantageously, the cis-1,4-polydienes may be prepared in the presence of a lanthanide-based catalyst system, and the same catalyst can then catalyze the hydrosilation reaction. This allows for a process for preparing silane-functional cis-1,4-polydiene polymers that may reduce process steps, minimize by-product waste, and eliminate the need for additional catalysts.

Polymers to be Functionalized

The polymers that undergo functionalization according to embodiments of the present invention are cis-1,4-polydienes that include 1,2-linkage content (i.e., vinyl content). For ease of description, these polymers may be referred to simply as cis-1,4-polydienes.

In one or more embodiments, the cis-1,4-polydienes may be synthesized by polymerizing conjugated dienes with a lanthanide-based catalyst system. In one or more embodiments, the cis-1,4-polydienes may include a reactive chain end. The cis-1,4-polydienes cis-1,4-polydienes with a reactive chain end prepared with a lanthanide-based catalyst may be referred to as a pseudo-living polymer, which will be discussed in further detail below. In these or other embodiments, the cis-1,4-polydienes may include a functionalized chain end (i.e., a chain end bearing a functional group).

In one or more embodiments, the cis-1,4-polydienes may have a cis-1,4-linkage content that is greater than 60%, in other embodiments greater than 75%, in other embodiments greater than 90%, in other embodiments greater than 96%, in other embodiments greater than 98%, and in other embodiments greater than 99%, where the percentages are based upon the number of diene mer units adopting the cis-1,4 linkage versus the total number of diene mer units. As indicated above, these polymers have a 1,2-linkage content. In one or more embodiments, these polymers may have a 1,2-linkage content that is greater than 0.1%, in other embodiments greater than 0.3%, and in other embodiments greater than 0.5%. In these or other embodiments, these polymers may have a 1,2-linkage content that is less than 7%, in other embodiments less than 5%, and in other embodiments less than 2%, where the percentages are based upon the number of diene mer units adopting the 1,2-linkage versus the total number of diene mer units. In one or more embodiments, these polymers may have a 1,2-linkage content that is from about 0.1% to about 7%, in other embodiments about 0.3% to about 5%, and in other embodiments about 0.5% to about 2%. The cis-1,4-, 1,2-, and trans-1,4-linkage contents can be determined by infrared spectroscopy.

In one or more embodiments, the number average molecular weight ($M_n$) of the cis-1,4-polydiene polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The molecular weight distribution or polydispersity ($M_w/M_n$) of the cis-1,4-polydienes may be from about 1.5 to about 5.0, and in other embodiments from about 2.0 to about 4.0. In these or other embodiments, the cis-1,4-polydienes of this invention may have a $M_w/M_n$ of less than 3.0, in other embodiments less than 2.5, in other embodiments less than 2.3, in other embodiments less than 2.2, in other embodiments less than 2.1, and in other embodiments less than 2.0.

In certain embodiments, in addition to the hydosilane, the cis-1,4-polydienes may include a secondary functionalization. In certain embodiments, a secondary-functionalizing agent may be added to the polymerization mixture that includes a reactive polymer to yield an end-functionalized polymer. In those embodiments where the cis-1,4-polydienes are end functionalized with a secondary functionalization, the percentage of polymer chains possessing a functional group may depend on various factors such as the type of catalyst, the type of monomer, the purity of the ingredients, the polymerization temperature, the monomer conversion, and many other factors. In one or more embodiments, at least about 10% of the polymer chains possess a functional end group, in other embodiments at least about 30% of the polymer chains possess a functional end group, in other embodiments at least about 50% of the polymer chains possess a functional end group, and in still other embodiments at least about 60% of the polymer chains possess a functional end group.

Synthesis of Cis-1,4-Polydienes

As indicated above, the cis-1,4-polydienes may be prepared by polymerizing conjugated diene monomer by using a lanthanide-based catalyst system.

Examples of conjugated diene monomer include 1,3-butadiene, isoprene, 1,3-pentadiene, 1,3-hexadiene, 2,3-dimethyl 1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

Practice of the present invention is not necessarily limited by the selection of any particular lanthanide-based catalyst system. In one or more embodiments, the catalyst systems employed include (a) a lanthanide-containing compound, (b) an alkylating agent, and (c) a halogen source. In other embodiments, a compound containing a non-coordinating anion or a non-coordinating anion precursor can be employed in lieu of a halogen source. In these or other embodiments, other organometallic compounds, Lewis bases, and/or catalyst modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference. In one or more embodiments, the catalyst system is a preformed lanthanide-based catalyst system. In other embodiments, the catalyst system is a lanthanide-based catalyst system form in situ.

Lanthanide-Containing Compounds

As mentioned above, the lanthanide-based catalyst systems employed in the present invention can include a lanthanide-containing compound. Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide 3-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis (2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl) phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl) phosphonate, neodymium butyl (2-ethylhexyl)phosphonate, neodymium (2-ethylhexyl) butylphosphonate, neodymium (1-methylheptyl) (2-ethylhexyl) phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl) phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl) (2-ethylhexyl)phosphinate, and neodymium (2-ethylhexyl) (p-nonylphenyl) phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing this class of neodymium compounds in inert organic solvents. Where lanthanide halides, lanthanide oxyhalides, or other lanthanide-containing compounds containing a halogen atom are employed, the lanthanide-containing compound may optionally also provide all or part of the halogen source in the lanthanide-based catalyst system.

As used herein, the term organolanthanide compound refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn$(cyclooctatetraene), $(C_5Me_5)_2LnR$, $LnR_3$, $Ln(allyl)_3$, and $Ln(allyl)_2Cl$, where Ln represents a lanthanide atom, and R represents a hydrocarbyl group. In one or more embodiments, hydrocarbyl groups useful in the present invention may contain heteroatoms such as, for example, nitrogen, oxygen, boron, silicon, sulfur, and phosphorus atoms.

Alkylating Agents

As mentioned above, the lanthanide-based catalyst systems employed in the present invention can include an alkylating agent. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as those from Groups 1, 2, and 13 metals under IUPAC numbering (Groups IA, IIA, and IIIA metals). Alkylating agents useful in the present invention include, but are not limited to, organoaluminum and organomagnesium compounds. As used herein, the term organoaluminum compound refers to any aluminum compound containing at least one aluminum-carbon bond. In one or more embodiments, organoaluminum compounds that are soluble in a hydrocarbon solvent can be employed. As used herein, the term organomagnesium compound refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

Organoaluminum Compounds

In one or more embodiments, organoaluminum compounds that can be utilized in the lanthanide-based catalyst system include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the lanthanide-based catalyst system is aluminoxanes. Aluminoxanes can comprise oligomeric linear aluminoxanes, which can be represented by the general formula:

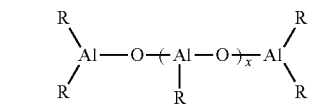

and oligomeric cyclic aluminoxanes, which can be represented by the general formula:

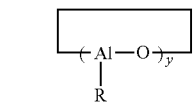

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane, modified methylaluminoxane, ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 5 to 95 percent of the methyl groups of methylaluminoxane with $C_2$ to $C_{12}$ hydrocarbyl groups, preferably with isobutyl groups, by using techniques known to those skilled in the art.

In one or more embodiments, aluminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination. In one or more embodiments, the catalyst compositions employed in the present invention are devoid or substantially devoid of aluminoxanes.

Organomagnesium Compounds

As mentioned above, alkylating agents useful in the lanthanide-based catalyst system can include organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a halogen atom, the organomagnesium compound can serve as both the alkylating agent and at least a portion of the halogen source in the catalyst systems. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

Halogen Sources

As mentioned above, the lanthanide-based catalyst systems employed in the present invention can include a halogen source. As used herein, the term halogen source refers to any substance including at least one halogen atom. In one or more embodiments, at least a portion of the halogen source can be provided by either of the above-described lanthanide-containing compound and/or the above-described alkylating agent, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Suitable elemental halogens include, but are not limited to, fluorine, chlorine, bromine, and iodine. Some specific examples of suitable mixed halogens include iodine monochloride, iodine monobromide, iodine trichloride, and iodine pentafluoride.

Suitable hydrogen halides include, but are not limited to, hydrogen fluoride, hydrogen chloride, hydrogen bromide, and hydrogen iodide.

Suitable organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Suitable inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Suitable metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Suitable organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

Non-Coordinating Anion/Non-Coordinating Anion Precursor

In one or more embodiments, the lanthanide-based catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

The lanthanide-based catalyst composition used in this invention may be formed by combining or mixing the foregoing catalyst ingredients. Although one or more active catalyst species are believed to result from the combination of the lanthanide-based catalyst ingredients, the degree of interaction or reaction between the various catalyst ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

Amounts

The foregoing lanthanide-based catalyst composition may have high catalytic activity for polymerizing conjugated dienes into cis-1,4-polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide-containing compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide-containing compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide-containing compound (Al/Ln) can be varied from about 1:1 to about 200:1, in other embodiments from about 2:1 to about 150:1, and in other embodiments from about 5:1 to about 100:1.

The molar ratio of the halogen-containing compound to the lanthanide-containing compound is best described in terms of the ratio of the moles of halogen atoms in the halogen source to the moles of lanthanide atoms in the lanthanide-containing compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In yet another embodiment, the molar ratio of the non-coordinating anion or non-coordinating anion precursor to the lanthanide-containing compound (An/Ln) may be from about 0.5:1 to about 20:1, in other embodiments from about 0.75:1 to about 10:1, and in other embodiments from about 1:1 to about 6:1.

Preparation of Catalyst System

The catalyst systems employed in the present invention can be formed by various methods.

In one or more embodiments, the lanthanide-based catalyst composition may be formed in situ by adding the catalyst ingredients to a solution containing monomer and solvent, or to bulk monomer, in either a stepwise or simultaneous manner. In one embodiment, the alkylating agent can be added first, followed by the lanthanide-containing compound, and then followed by the halogen source or by the compound containing a non-coordinating anion or the non-coordinating anion precursor.

In one or more embodiments, the lanthanide-based catalyst composition may be preformed. That is, the catalyst ingredients are premixed outside the polymerization system. In one or more embodiments, the premixing of the catalyst ingredients forms an active catalyst system, which is a catalyst system capable of polymerizing monomer, especially conjugated diene monomer into the desired cis-1,4-polydienes desired by one or more embodiments of this invention. Examples of useful processes for preforming a lanthanide-based catalyst composition are disclosed in U.S. Pat. Nos. 5,686,371, 6,576,731, U.S. Pat. Publ. No. 2002/0035226, U.S. Pat. Publ. No. 2012/0208964, and U.S. Pat. Publ. No. 2013/0237669, which are incorporated herein by reference.

Order of Addition

In one or more embodiments, the catalyst system may be formed by combining the catalyst ingredients simultaneously or sequentially. Where the ingredients are combined sequentially, the alkylating agent can be first combined with the lanthanide-containing compound, and then the mixture can be combined with the halogen source or the compound containing a non-coordinating anion or the non-coordinating anion precursor. In other embodiments, the alkylating agent and the halogen source (or non-coordinating anion or non-coordinating anion precursor) can first be combined, and then the mixture can be combined with the lanthanide-containing compound. In yet other embodiments, the lanthanide-containing compound and the halogen source (or non-coordinating anion or non-coordinating anion precursor) can first be combined, and then the mixture can be combined with the alkylating agent.

Use of Solvent

In one or more embodiments, the preformation of the catalyst may take place with a solvent. In one or more embodiments, a solvent may be employed as a carrier to either dissolve or suspend the catalyst in order to facilitate the delivery of the catalyst to the polymerization system. In other embodiments, monomer can be used as the carrier. In yet other embodiments, the catalyst can be used in their neat state without any solvent.

In one or more embodiments, suitable solvents include those organic compounds that will not undergo polymerization or incorporation into propagating polymer chains during the polymerization of monomer in the presence of the catalyst or initiator. In one or more embodiments, these organic species are liquid at ambient temperature and pressure. In one or more embodiments, these organic solvents are inert to the catalyst or initiator. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

Use of Stabilizers

In one or more embodiments, the catalyst system may optionally be prepared, for example by preforming the catalyst system, in the presence of a small amount of an alkene containing compound, which may serve to stabilize the catalyst system. Useful alkene containing compounds may include monomer as defined herein. Specific examples of suitable monomers for preforming the catalyst system include conjugated diene monomers such as 1,3-butadiene or isoprene. The amount of alkene containing compound that may be used for preforming the catalyst can range from about 1 to about 100 moles, in other embodiments from about 2.5 to about 50 moles, and in other embodiments from about 5 to about 20 moles per mole of the lanthanide-containing compound.

Conditions for Forming Catalyst System

In one or more embodiments, the catalyst systems used in this invention may be prepared at specific temperatures. In one or more embodiments, the catalyst compositions can be prepared at a temperature of at least −20° C., in other embodiments at least 0° C., in other embodiments at least 20° C., and in other embodiments at least 40° C. In these or other embodiments, the catalyst compositions can be prepared at a temperature of at most 100° C., in other embodiments at most 80° C., in other embodiments at most 60° C., in other embodiments at most 40° C., in other embodiments at most 20° C., and in other embodiments at most 0° C.

Catalyst System Aging

In one or more embodiments, the catalyst composition may be aged prior to use (i.e. prior to being added to the polymerization system).

In one or more embodiments, the catalyst composition may be aged at a temperature of at least −20° C., in other embodiments at least 0° C., in other embodiments at least 20° C., and in other embodiments at least 40° C. In these or other embodiments, the catalyst compositions may be aged at a temperature of at most 100° C., in other embodiments at most 80° C., in other embodiments at most 60° C., in other embodiments at most 40° C., in other embodiments at most 20° C., and in other embodiments at most 0° C. In certain embodiments, the catalyst composition may be aged in an environment without temperature control, where the catalyst composition would potentially be subject to varying environmental temperatures. In these or other embodiments, the catalyst composition may be aged at a temperature as described above and further aged, for at least a portion of the aging time, at an uncontrolled temperature.

In one or more embodiments, the catalyst composition may be aged for at least 1 hour, in other embodiments at least 3 hours, in other embodiments at least 6 hours, in other embodiments at least 12 hours, in other embodiments at least 24 hours, in other embodiments at least 6 days, in other embodiments at least 12 days, in other embodiments at least 30 days, and in other embodiments at least 60 days. In these or other embodiments, the catalyst compositions may be aged for at most 1000 days, in other embodiments at most 750 days, in other embodiments at most 500 days, in other embodiments at most 300 days, and in other embodiments at most 100 days, in other embodiments at most 24 days, in other embodiments at most 18 days, and in other embodiments at most 12 days. In one or more embodiments, the catalyst composition is aged from about 4 to about 16 days, in other embodiments from about 5 to about 15 days, and in other embodiments from about 6 to about 12 days.

Specific Catalyst Systems

In one or more embodiments, the catalyst employed in the practice of this invention is a preformed catalyst that is the combination or reaction product of a lanthanide carboxylate, an aluminum hydride, and an organometallic halide. In specific embodiments, the lanthanide carboxylate is a neodymium carboxylate, the aluminum hydride is a dihydrocarbylaluminum hydride and/or hydrocarbylaluminum dihydride, and the organometallic halide is a hydrocarbyl aluminum sesquichloride. In still more specific embodiments, the catalyst system is the combination or reaction product of a neodymium neodecanoate, diisobutylaluminum hydride, and ethylaluminum sesquichloride. The catalyst system may have a diisobutylaluminum hydride to neodymium neodecanoate molar ratio from about 5 to about 40, or in other embodiments from about 10 to about 20, and an ethylaluminum sesquichloride to neodymium neodecanoate molar ratio, which is best described as a molar ratio of the moles of halogen atoms in the ethylaluminum sesquichloride to the moles of lanthanide atoms in the neodymium neodecanoate (halogen/Ln), of from about 1 to about 4, or in other embodiments from about 2 to about 3. In these or other embodiments, these specific catalyst systems may include a conjugated diene (such as 1,3-butadiene or isoprene) as a stabilizer. In yet still more specific embodiments, the recited specific catalyst systems are aged as described herein.

Catalyst systems that may be employed in one or more embodiments of this invention are commercially available. For example, useful preformed catalyst systems are available under the tradename COMCAT Nd—FC (NH), COMCAT Nd—FC/20 (NH), COMCAT Nd—FC/SF [COMAR CHEMICALS (Pty) Ltd].

Polymerization Mixture

The cis-1,4-polydienes having a 1,2-linkage, which may simply be referred to as the polymer, may be prepared by polymerizing conjugated diene monomer in an amount sufficient to prepare a polymer of a desired molecular weight in the presence of a catalytically effective amount of the catalyst. The introduction of the catalyst and the conjugated diene monomer forms a polymerization mixture, which may also be referred to as polymerization system, in which a polymer is formed. The amount of the catalyst to be employed may depend on the interplay of various factors such as the type of catalyst or initiator employed, the purity of the ingredients, the polymerization temperature, the polymerization rate and conversion desired, the molecular weight desired, and many other factors. Accordingly, a specific catalyst amount cannot be definitively set forth except to say that catalytically effective amounts of the catalyst may be used.

In one or more embodiments, the amount of the coordinating metal compound (e.g., a lanthanide-containing compound) used can be varied from about 0.001 to about 2 mmol, in other embodiments from about 0.005 to about 1 mmol, and in still other embodiments from about 0.01 to about 0.2 mmol per 100 gram of monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst or initiator is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Pseudo-Living Polymer

Polymerization catalyzed by a lanthanide-based catalyst produces polymers (i.e. cis-1,4-polydienes) where some or all of the resulting polymer chains may possess reactive chain ends before the polymerization mixture is quenched. Thus, reference to a reactive polymer refers to a polymer having a reactive chain end. As indicated above, the reactive polymer prepared with a lanthanide-based catalyst may be referred to as a pseudo-living polymer. In one or more embodiments, a polymerization mixture including reactive polymer may be referred to as an active polymerization mixture or active polymerization system. The percentage of polymer chains possessing a reactive end depends on various factors such as the type of catalyst or initiator, the type of monomer, the purity of the ingredients, the polymerization temperature, the monomer conversion, and many other factors. In one or more embodiments, at least about 20% of the polymer chains possess a reactive end, in other embodiments at least about 50% of the polymer chains possess a reactive end, and in still other embodiments at least about 80% of the polymer chains possess a reactive end.

End-Functionalization Reaction

In one or more embodiments, the pseudo-living polymer, which includes a reactive chain end, may optionally be end functionalized by reacting the reactive chain end with a secondary-functionalizing agent.

In one or more embodiments, the secondary-functionalizing agent can be reacted with the reactive polymer after a desired monomer conversion is achieved but before the polymerization mixture is quenched by a quenching agent. In one or more embodiments, the reaction between the secondary-functionalizing agent and the reactive polymer may take place within 2 hours, in other embodiments within 1 hour, in other embodiments within 30 minutes, in other embodiments within 5 minutes, and in other embodiments within one minute after the peak polymerization temperature is reached. In one or more embodiments, the reaction between the secondary-functionalizing agent and the reactive polymer can occur once the peak polymerization temperature is reached. In other embodiments, the reaction between the secondary-functionalizing agent and the reactive polymer can occur after the reactive polymer has been stored. In one or more embodiments, the storage of the reactive polymer occurs at room temperature or below room temperature under an inert atmosphere.

The time required for completing the reaction between the secondary-functionalizing agent and the reactive polymer depends on various factors such as the type and amount of the catalyst used to prepare the reactive polymer, the type and amount of the secondary-functionalizing agent, as well as the temperature at which the functionalization reaction is conducted. In one or more embodiments, the reaction between the secondary-functionalizing agent and the reactive polymer can be conducted for about 10 to 60 minutes.

In one or more embodiments, the secondary-functionalizing agent may be introduced to the polymerization mixture at a location (e.g., within a vessel) where the polymerization has been conducted. In other embodiments, the secondary-functionalizing agent may be introduced to the polymerization mixture at a location that is distinct from where the polymerization has taken place. For example, the functionalizing agent may be introduced to the polymerization mixture in downstream vessels including downstream reactors or tanks, in-line reactors or mixers, extruders, or devolatilizers.

Secondary-Functionalizing Agents

In one or more embodiments, suitable secondary-functionalizing agents include those compounds that contain groups that may react with a pseudo-living polymer.

Exemplary secondary-functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Pat. No. 7,879,952, hydrobenzamide compounds as disclosed in U.S. Pat. No. 7,671,138, nitro compounds as disclosed in U.S. Pat. No. 7,732,534, protected oxime compounds as disclosed in U.S. Pat. No. 8,088,868, hetrocyclic nitrile compounds disclosed in U.S. Pat. No. 8,314,189, halosilanes containing an amino group disclosed in U.S. Pat. No. 8,258,332, imide compounds containing a protected amino group disclosed in U.S. Pat. No. 7,906,592, nitroso compounds disclosed in U.S. Pat. Pub. No. 2010/0168378, amide containing compounds disclosed in U.S. Pat. Pub. No. 2010/0099826, carboxylic or thiocarboxylic esters containing a silylated amino group disclosed in U.S. Pat. Pub. No. 2011/0077325, polyoxime compounds disclosed in U.S. Pat. Publ. No. 2011/0152449, polycyano compounds disclosed in U.S. Pat. Pub. No. 2011/0288200, nitrile compounds containing a protected amino group disclosed in U.S. Pat. Pub. No. 2012/0059112 all of which are incorporated herein by reference.

The amount of the secondary-functionalizing agent that can be added to the polymerization mixture to yield a functionalized polymer may depend on various factors including the type and amount of catalyst used to synthesize the reactive polymer and the desired degree of functionalization. In one or more embodiments, where the reactive polymer is prepared by employing a lanthanide-based catalyst, the amount of functionalizing agent employed can be described with reference to the lanthanide metal of the lanthanide-containing compound. For example, the molar ratio of the functionalizing agent to the lanthanide metal may be from about 1:1 to about 80:1, in other embodiments from about 5:1 to about 40:1, and in other embodiments from about 10:1 to about 25:1.

In one or more embodiments, the amount and type of secondary-functionalization agent may be selected to have a minimal impact on the catalyst activity. In these or other embodiments, the secondary-functionalization agent does stop or substantially inhibit the ability of the hydrosilane compound to react with the cis-1,4-polydiene which includes 1,2-linkage.

Silane Functionalization

Generally speaking, the silane-functionalized polymers of the present invention may be prepared by combining a cis-1,4-polydiene, a hydrosilane compound, and a lanthanide-based catalyst. In one or more embodiments, the hydrosilane compound may be added to a polymerization mixture in which the cis-1,4-polydiene was prepared. In these or other embodiments, the cis-1,4-polydiene may be a pseudo-living polymer, which indicates that the hydrosilane is introduced prior to quenching the polymerization mixture or end-functionalizing the cis-1,4-polydiene. To the extent that the hydrosilation reaction of the hydrosilane takes place at the terminal, reactive end of the polymer, further functionalization with a secondary funcitionalization agent may occur on separate reactive polymers. In these or other embodiments, the amount of the hydrosilane added is not sufficient to terminate all of the reactive chain ends. In other embodiments, the hydrosilane compound is added to the polymerization mixture after the cis-1,4-polydiene has been end functionalized with a secondary-functionalization agent. In one or more embodiments, the hydrosilane compound is introduced to the polymerization mixture containing the cis-1,4-polydiene prior to the polymerization mixture being quenched. In one or more embodiments, the lanthanide-based catalyst system employed during the functionalization reaction with the hydrosilane compound is the same lanthanide-based catalyst system that was employed to synthesize the cis-1,4-polydiene. In other embodiments, additional lanthanide-based catalyst is added to the polymerization system. In these or other embodiments, the lanthanide-based catalyst is the only catalyst present during the functionalization with the hydrosilane compound (i.e., other catalysts, such as transitioned metal catalysts, are not present during the functionalization reaction).

As noted above, the hydrosilane compound may be added to the polymerization mixture in which the cis-1,4-polydiene was prepared. In these or other embodiments, the hydrosilane compound may be added after a desired monomer conversion is achieved but before the polymerization mixture is quenched by a quenching agent. In one or more embodiments, the hydrosilane compound may be added after a substantial amount of the polymerization is completed. In one or more embodiments, the hydrosilane compound may be added after a monomer conversion of at least 80%, in other embodiments at least 90%, and in other embodiments at least 95%.

In one or more embodiments, the addition of the hydrosilane compound to the polymerization mixture in which the cis-1,4-polydiene was prepared may take place within 30 minutes, in other embodiments within 5 minutes, and in other embodiments within one minute after the peak polymerization temperature is reached. In one or more embodiments, the addition of the hydrosilane compound to the polymerization mixture in which the cis-1,4-polydiene was prepared can occur once the peak polymerization temperature is reached. In other embodiments, the addition of the hydrosilane compound to the polymerization mixture in which the cis-1,4-polydiene was prepared can occur after the pseudo-living cis-1,4-polydiene has been stored.

In one or more embodiments, the hydrosilane compound may be introduced to the polymerization mixture at a location (e.g., within a vessel) where the polymerization has been conducted. In other embodiments, the hydrosilane compound may be introduced to the polymerization mixture at a location that is distinct from where the polymerization has taken place. For example, the hydrosilane compound may be introduced to the polymerization mixture in downstream vessels including downstream reactors or tanks, in-line reactors or mixers, extruders, or devolatilizers.

The reaction between the cis-1,4-polydiene and the hydrosilane compound may proceed under suitable reaction conditions. The time and temperate required for completing the reaction between the cis-1,4-polydiene and the hydrosilane compound depends on various factors such as the type and amount of the catalyst, the type and amount of the hydrosilane compound, the amount of 1,2-linkage in the cis-1,4-polydieneas well as the temperature at which the functionalization reaction is conducted.

In one or more embodiments, the reaction between the cis-1,4-polydiene and the hydrosilane compound may be conducted at a temperature of at least 25° C., in other embodiments at least 45° C., in other embodiments, and in other embodiments at least 65° C. In these or other embodiments, the reaction between the cis-1,4-polydiene and the hydrosilane compound may be conducted at a temperature of at most 80° C., in other embodiments at most 100° C., in other embodiments, and in other embodiments at most 120° C. In one or more embodiments, the reaction between the cis-1,4-polydiene and the hydrosilane compound may be conducted at a temperature of about 25° C. to about 120° C., in other embodiments a temperature of about 45° C. to about 100° C., in other embodiments, and in other embodiments a temperature of about 65° C. to about 80° C.

In one or more embodiments, the reaction between the reaction between the cis-1,4-polydiene and the hydrosilane compound may be conducted for at least 15 minutes, in other embodiments at least 30 minutes, and in other embodiments at least 2 hours. In these or other embodiments, the reaction between the cis-1,4-polydiene and the hydrosilane compound may be conducted for at most 4 hours, in other embodiments at most 8 hours, and in other embodiments at most 18 hours. In one or more embodiments, the reaction between the reaction between the cis-1,4-polydiene and the hydrosilane compound may be conducted for about 15 minutes to about 18 hours in other embodiments for about 30 minutes to about 8 hours and in other embodiments for about 2 hours to about 4 hours.

In one or more embodiments, the amount of the hydrosilane compound used to prepare the silane-functionalized polymers of the present invention may be represented by the molar ratio of the hydrosilane compound to the lanthanide-containing compound within the polymerization mixture (hydrosilane compound/Ln). In one or more embodiments, the hydrosilane compound/Ln molar ratio is at least 25, in other embodiments at least 50, in other embodiments at least 100, in other embodiments at least 200, and in other embodiments at least 500. In these or other embodiments, the hydrosilane compound/Ln molar ratio is at most 600, in other embodiments at most 1000, and in other embodiments at most 5000. In one or more embodiments, the hydrosilane compound/Ln molar ratio is from about 25 to about 5000, in other embodiments from about 50 to about 1000, in other embodiments from about 100 to about 1000, and in other embodiments from about 100 to about 600.

In other embodiments, the amount of the hydrosilane compound used to prepare the silane-functionalized polymers of the present invention may be expressed with respect to the amount of polymer present within the polymerization mixture. In one or more embodiments, the amount of the hydrosilane compound employed is at least 1 mmol, in other embodiments at least 5 mmol, in other embodiments at least 10 mmol, in other embodiments at least 20 mmol, and in other embodiments at least 30 mmol per 100 g of cis-1,4-polydiene. In these or other embodiments, the amount of the hydrosilane compound employed is at most 50 mmol, in other embodiments at most 80 mmol, in other embodiments at most 95 mmol, and in other embodiments at most 100 mmol per 100 g of cis-1,4-polydiene. In one or more embodiments, the amount of the hydrosilane compound employed is from about 1 mmol to about 100 mmol, in other embodiments is from about 5 mmol to about 95 mmol, in other embodiments is from about 20 mmol to about 80 mmol, and in other embodiments is from about 30 mmol to about 50 mmol.

Hydrosilane Compound

The hydrosilane compounds employed in one or more embodiments of the invention include those compounds that contain at least one hydrogen atom bonded to a silicon atom. In one or more embodiments, the hydrosilane compound may include a hydrocarbyloxy group attached to a silicon atom in addition to a hydrogen atom attached to a silicon atom.

In one or more embodiments, the hydrosilane compounds may be monomeric, dimeric, trimeric, tetrameric, oligomeric, or polymeric. In these or other embodiments, the hydrosilane compounds may have a cyclic or acyclic structure. A combination of two or more hydrosilane compounds may be employed. As will be described in more detail below, several species of suitable hydrosilane compounds can include a halogen atom, and therefore where the hydrosilane compound includes a halogen atom, the hydrosilane compound may also serve as all or part of the halogen source in the above-mentioned catalyst system.

In one or more embodiments, a hydrosilane compound may be defined by the formula I

where x is an integer from 1 to 4, and each R is individually a halogen atom or a monovalent organic group, or where two or more R groups join to form a polyvalent organic group. For purposes of this specification, polyvalent organic group refers to an organic group that has a valence of two or more, such as a divalent, trivalent or tetravalent organic group.

In one or more embodiments, where the monovalent organic groups of the hydrosilane defined by formula I are hydrocarbyloxy groups or silyloxy groups, the hydrosilane compound may be defined by the formula II

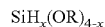

where x is an integer from 1 to 4, and each R is individually a hydrocarbyl or silyl group, or where two or more R groups join to form a polyvalent organic group.

In one or more embodiments, where the R group of the hydrosilane defined by formula II is a silyl group, the hydrosilane compound may be defined by the formula III

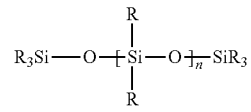

where n is an integer from 0 to 8, and each R is individually a hydrogen atom, halogen atom, or a monovalent organic group, or where two or more R groups join to form a bond or a polyvalent organic group, with the proviso that at least one R in the hydrosilane compound is a hydrogen atom. In one or more embodiments, n may be in integer from 2 to 4.

In one or more embodiments, where the R groups of formula III combine to from a bond or a polyvalent group, hydrosilane compound may be defined by the formula IV

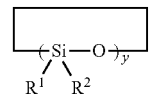

where $R^1$ and $R^2$ are each individually a hydrogen atom, halogen atom, or a monovalent organic group, with the proviso that the at least one $R^1$ or $R^2$ in the hydrosilane compound is a hydrogen atom, and y is from about 3 to about 6 units.

In one or more embodiments, the monovalent organic groups of the hydrosilane compounds may be hydrocarbyl groups, which include, but are not limited to, alkyl, cycloalkyl, alkenyl, cycloalkenyl, aryl, allyl, aralkyl, alkaryl, or alkynyl groups. Hydrocarbyl groups also include substituted hydrocarbyl groups, which refer to hydrocarbyl groups in which one or more hydrogen atoms have been replaced by a substituent such as a hydrocarbyl, hydrocarbyloxy, silyl, or silyloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, the monovalent organic groups of the hydrosilane compounds may be hydrocarbyloxy groups such as, but not limited to, alkyloxy, cycloalkyloxy, alkenyloxy, cycloalkenyloxy, aryloxy, allyloxy, aralkyloxy, alkaryloxy, or alkynyloxy groups. Hydrocarbyloxy groups also include substituted hydrocarbyloxy groups, which refer to hydrocarbyloxy groups in which one or more hydrogen atoms have been replaced by a substituent such as a hydrocarbyl, hydrocarbyloxy, silyl, or silyloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, the monovalent organic groups of the hydrosilane compounds may be silyl groups, which include, but are not limited to, trihydrocarbylsilyl, dihydrocarbylhydrosilyl, or hydrocarbyldihydrosilyl. Silyl groups also include substituted silyl groups, which refer to silyl groups in which one or more hydrogen atoms have been replaced by a substituent such as a hydrocarbyl, hydrocarbyloxy, silyl, or silyloxy group. In one or more embodiments, these groups may include from one, or the appropriate minimum number of carbon atoms to form the group, to about 20 carbon atoms. These groups may include heteroatoms such as, but not limited to, nitrogen, boron, oxygen, silicon, sulfur, tin, and phosphorus atoms, in addition to the parent silicon atom.

Types of silyl groups and substituted silyl groups include, but are not limited to, trihydrocarbylsilyl, trisilyloxysilyl, trihydrocarbyloxysilyl, trisilylsilyl, dihydrocarbylhydrosilyl, dihydrocarbyl(silyloxy) silyl, dihydrocarbyl(silyl) silyl, dihydrocarbyl(hydrocarbyloxy)silyl, hydrocarbyldihydrosilyl, hydrocarbyl(disilyloxy)silyl, hydrocarbyl(disilyl)silyl, and hydrocarbyl(dihydrocarbyloxy)silyl groups. For example, types of silyl groups may include trialkylsilyl, dialkylhydrosilyl, dialkyl(silyloxy)silyl, dialkyl(silyl) silyl, tricycloalkylsilyl, dicycloalkylhydrosilyl, dicycloalkyl(silyloxy) silyl, dicycloalkyl(silyl) silyl, trialkenylsilyl, dialkenylhydrosilyl, dialkenyl(silyloxy) silyl, dialkenyl(silyl) silyl, tricycloalkenylsilyl, dicycloalkenylhydrosilyl, dicycloalkenyl(silyloxy) silyl, dicycloalkenyl(silyl) silyl, triarylsilyl, diarylhydrosilyl, diaryl(silyloxy)silyl, diaryl(silyl)silyl, triallylsilyl, diallylhydrosilyl, diallyl(silyloxy)silyl, diallyl(silyl)silyl, triaralkylsilyl, diaralkylhydrosilyl, diaralkyl(silyloxy) silyl, diaralkyl(silyl) silyl, trialkarylsilyl, dialkarylhydrosilyl, dialkaryl(silyloxy) silyl, dialkaryl(silyl) silyl, trialkynylsilyl, dialkynylhydrosilyl, dialkynyl(silyloxy) silyl, dialkynyl(silyl) silyl, tris(trialkylsilyloxy) silyl, tris(triarylsilyloxy) silyl, tris(tricycloalkylsilyloxy) silyl, tris(trialkoxysilyloxy)silyl, tris(triaryloxysilyloxy) silyl, or tris(tricycloalkyloxysilyloxy)silyl groups.

In one or more embodiments, the monovalent organic groups of the hydrosilane compounds may be silyloxy groups, which include, but are not limited to, trihydrocarbylsilyloxy, dihydrocarbylhydrosilyloxy, or hydrocarbyldihydrosilyloxy. Silyloxy groups also include substituted silyloxy groups, which refer to silyloxy groups in which one or more hydrogen atoms have been replaced by a substituent such as a hydrocarbyl, hydrocarbyloxy, silyl, or silyloxy group. In one or more embodiments, these groups may include from one, or the appropriate minimum number of carbon atoms to form the group, to about 20 carbon atoms. These groups may include heteroatoms such as, but not limited to, nitrogen, boron, oxygen, silicon, sulfur, tin, and phosphorus atoms, in addition to the parent silicon atom.

In one or more embodiments, where the hydrosilane compound is defined by formula I and contains three hydrocarbyloxy groups, the hydrosilane compound may be referred to as a trihydrocarbyloxy silane compound. In one or more embodiments, where the hydrosilane compound is defined by formula II and contains one hydrocarbyl group and two hydrocarbyloxy group, the hydrosilane compound may be referred to as a hydrocarbyl dihydrocarbyloxy silane compound. In one or more embodiments, where the hydrosilane compound is defined by formula I and contains two hydrocarbyl groups and one hydrocarbyloxy group, the hydrosilane compound may be referred to as a dihydrocarbyl hydrocarbyloxy silane compound. In one or more embodiments, where the hydrosilane compound is defined by formula I and contains three silyloxy groups, the hydrosilane compound may be referred to as a trisilyloxy silane compound. In one or more embodiments, where the hydrosilane compound is defined by formula I and contains one hydrocarbyl group and two silyloxy group, the hydrosilane compound may be referred to as a hydrocarbyl disilyloxy silane compound. In one or more embodiments, where the hydrosilane compound is defined by formula I and contains two hydrocarbyl groups and one silyloxy group, the hydrosilane compound may be referred to as a dihydrocarbyl silyloxy silane compound. In one or more embodiments, where the hydrosilane compound is defined by formula III the hydrosilane compound may be referred to as a siloxane compound. In one or more embodiments, where the hydrosilane compound is defined by formula IV, the hydrosilane compound may be referred to as cyclic hydrosilane compound.

Representative examples of suitable trihydrocarbyloxy silane compounds include, but are not limited to, trialkyloxy silane, tricycloalkyloxy silane, triaryloxy silane, triaralkyloxy silane, trialkaryloxy silane, dialkyloxy cycloalkyloxy silane, alkyloxy dicycloalkyloxy silane, dialkyloxy aryloxy silane, alkyloxy diaryloxy silane, and alkyloxy aryloxy cycloalkyloxy silane.

Representative examples of suitable hydrocarbyl dihydrocarbyloxy silane compounds include, but are not limited to, alkyl dialkyloxy silane, alkyl dicycloalkyloxy silane, alkyl diaryloxy silane, alkyl diaralkyloxy silane, alkyl dialkaryloxy silane, alkyl alkyloxy cycloalkyloxy silane, alkyl alkyloxy aryloxy silane, cycloalkyl dialkyloxy silane, cycloalkyl dicycloalkyloxy silane, cycloalkyl diaryloxy silane, cycloalkyl diaralkyloxy silane, cycloalkyl dialkaryloxy silane, cycloalkyl alkyloxy cycloalkyloxy silane, cycloalkyl alkyloxy aryloxy silane, aryl dialkyloxy silane, aryl dicycloalkyloxy silane, aryl diaryloxy silane, aryl diaralkyloxy silane, aryl dialkaryloxy silane, aryl alkyloxy cycloalkyloxy silane, aryl alkyloxy aryloxy silane, aralkyl dialkyloxy silane, aralkyl dicycloalkyloxy silane, aralkyl diaryloxy silane, aralkyl diaralkyloxy silane, aralkyl dialkaryloxy silane, aralkyl alkyloxy cycloalkyloxy silane, aralkyl alkyloxy aryloxy silane, alkaryl dialkyloxy silane, alkaryl dicycloalkyloxy silane, alkaryl diaryloxy silane, alkaryl diaralkyloxy silane, alkaryl dialkaryloxy silane, alkaryl alkyloxy cycloalkyloxy silane, and alkaryl alkyloxy aryloxy silane.

Representative examples of suitable dihydrocarbyl hydrocarbyloxy silane compounds include, but are not limited to, dialkyl alkyloxy silane, dialkyl cycloalkyloxy silane, dialkyl aryloxy silane, dialkyl aralkyloxy silane, dialkyl alkaryloxy silane, dicycloalkyl alkyloxy silane, dicycloalkyl cycloalkyloxy silane, dicycloalkyl aryloxy silane, dicycloalkyl aralkyloxy silane, dicycloalkyl alkaryloxy silane, diaryl alkyloxy silane, diaryl cycloalkyloxy silane, diaryl aryloxy silane, diaryl aralkyloxy silane, diaryl alkaryloxy silane, diaralkyl alkyloxy silane, diaralkyl cycloalkyloxy silane, diaralkyl aryloxy silane, diaralkyl aralkyloxy silane, diaralkyl alkaryloxy silane, dialkaryl alkyloxy silane, dialkaryl cycloalkyloxy silane, dialkaryl aryloxy silane, dialkaryl aralkyloxy silane, dialkaryl alkaryloxy silane, alkyl cycloalkyl alkyloxy silane, alkyl cycloalkyl cycloalkyloxy silane, alkyl cycloalkyl aryloxy silane, alkyl cycloalkyl aralkyloxy silane, alkyl cycloalkyl alkaryloxy silane, alkyl aryl alkyloxy silane, alkyl aryl cycloalkyloxy silane, alkyl aryl aryloxy silane, alkyl aryl aralkyloxy silane, alkyl aryl alkaryloxy silane, aryl cycloalkyl alkyloxy silane, aryl cycloalkyl cycloalkyloxy silane, aryl cycloalkyl aryloxy silane, aryl cycloalkyl aralkyloxy silane, and aryl cycloalkyl alkaryloxy silane.

Representative examples of suitable trisilyloxy silane compounds include, but are not limited to, tris(trialkylsilyloxy)silane, tris(dialkylsilyloxy)silane, bis(trialkylsilyloxy) (dialkylsilyloxy) silane, (trialkylsilyloxy)bis(dialkylsilyloxy) silane, tris[(dialkyl) (trialkylsilyloxy)silyloxy]silane, tris[(dialkyl) (dialkylsilyloxy)silyloxy]silane, bis(trialkylsilyloxy) [(dialkyl) (trialkylsilyloxy) silyloxy]silane, and bis (dialkylsilyloxy) [(dialkyl) (dialkylsilyloxy) silyloxy]silane.

Representative examples of suitable hydrocarbyl disilyloxy silane compounds include, but are not limited to, alkyl bis(trialkylsilyloxy)silane, alkyl bis(dialkylsilyloxy) silane, alkyl bis (trialkylsilyloxy) (dialkylsilyloxy) silane, alkyl bis [(dialkyl) (trialkylsilyloxy) silyloxy]silane, alkyl bis[(dialkyl) (dialkylsilyloxy) silyloxy]silane, alkyl (trialkylsilyloxy) [(dialkyl) (trialkylsilyloxy) silyloxy]silane, alkyl (dialkylsilyloxy) [(dialkyl) (dialkylsilyloxy) silyloxy]silane, cycloalkyl bis(trialkylsilyloxy) silane, cycloalkyl bis(dialkylsilyloxy) silane, cycloalkyl (trialkylsilyloxy) (dialkylsilyloxy) silane, cycloalkyl bis[(dialkyl) (trialkylsilyloxy) silyloxy] silane, cycloalkyl bis[(dialkyl) (dialkylsilyloxy)silyloxy]silane, cycloalkyl (trialkylsilyloxy) [(dialkyl) (trialkylsilyloxy) silyloxy]silane, cycloalkyl (dialkylsilyloxy) [(dialkyl) (dialkylsilyloxy) silyloxy]silane, aryl bis(trialkylsilyloxy) silane, aryl bis(dialkylsilyloxy) silane, aryl (trialkylsilyloxy) (dialkylsilyloxy)silane, aryl bis[(dialkyl) (trialkylsilyloxy) silyloxy]silane, aryl bis[(dialkyl) (dialkylsilyloxy) silyloxy] silane, aryl (trialkylsilyloxy) [(dialkyl) (trialkylsilyloxy) silyloxy]silane, aryl (dialkylsilyloxy) [(dialkyl) (dialkylsilyloxy) silyloxy]silane, aralkyl bis(trialkylsilyloxy) silane, aralkyl bis(dialkylsilyloxy) silane, aralkyl (trialkylsilyloxy) (dialkylsilyloxy) silane, aralkyl bis[(dialkyl) (trialkylsilyloxy) silyloxy]silane, aralkyl bis[(dialkyl) (dialkylsilyloxy) silyloxy]silane, aralkyl (trialkylsilyloxy) [(dialkyl) (trialkylsilyloxy) silyloxy]silane, aralkyl (dialkyl) (dialkylsilyloxy) silyloxy]silane, alkaryl bis(trialkylsilyloxy) silane, alkaryl bis(dialkylsilyloxy) silane, alkaryl (trialkylsilyloxy) (dialkylsilyloxy) silane, alkaryl bis[(dialkyl) (trialkylsilyloxy) silyloxy]silane, alkaryl bis[(dialkyl) (dialkylsilyloxy) silyloxy]silane, alkaryl (trialkylsilyloxy) [(dialkyl) (trialkylsilyloxy) silyloxy]silane, and alkaryl (dialkylsilyloxy) [(dialkyl) (dialkylsilyloxy) silyloxy]silane.

Representative examples of suitable dihydrocarbyl silyloxy silane compounds include, but are not limited to, dialkyl (trialkylsilyloxy)silane, dialkyl dialkylsilyloxysilane, dialkyl (dialkyl) (trialkylsilyloxy) silyloxysilane, dialkyl (dialkyl) (dialkylsilyloxy)silyloxysilane, dicycloalkyl (trialkylsilyloxy)silane, dicycloalkyl dialkylsilyloxysilane, dicycloalkyl (dialkyl) (trialkylsilyloxy)silyloxysilane, dicycloalkyl (dialkyl) (dialkylsilyloxy) silyloxysilane, diaryl (trialkylsilyloxy)silane, diaryl dialkylsilyloxysilane, diaryl (dialkyl) (trialkylsilyloxy) silyloxysilane, diaryl (dialkyl) (dialkylsilyloxy) silyloxysilane, diaralkyl (trialkylsilyloxy) silane, diaralkyl dialkylsilyloxysilane, diaralkyl (dialkyl) (trialkylsilyloxy) silyloxysilane, diaralkyl (dialkyl) (dialkylsilyloxy) silyloxysilane, dialkaryl (trialkylsilyloxy) silane, dialkaryl dialkylsilyloxysilane, dialkaryl (dialkyl) (trialkylsilyloxy) silyloxysilane, dialkaryl (dialkyl) (dialkylsilyloxy) silyloxysilane, alkyl cycloalkyl (trialkylsilyloxy)silane, alkyl cycloalkyl dialkylsilyloxysilane, alkyl cycloalkyl (dialkyl) (trialkylsilyloxy)silyloxysilane, alkyl cycloalkyl (dialkyl)(dialkylsilyloxy)silyloxysilane, alkyl aryl (trialkylsilyloxy)silane, alkyl aryl dialkylsilyloxysilane, alkyl aryl (dialkyl)(trialkylsilyloxy)silyloxysilane, alkyl aryl (dialkyl) (dialkylsilyloxy)silyloxysilane, aryl cycloalkyl (trialkylsilyloxy)silane, aryl cycloalkyl dialkylsilyloxysilane, aryl cycloalkyl (dialkyl) (trialkylsilyloxy)silyloxysilane, and aryl cycloalkyl (dialkyl) (dialkylsilyloxy) silyloxysilane.

Representative examples of suitable siloxane compounds include, but are not limited to, 1,1,3,3-tetraalkyldisiloxane, 1,1,1,3,3,-butaalkyldisiloxane, 1,1,3,3,5,5-hexaalkyltrisiloxane, 1,1,1,3,3,5,5-heptaalkyltrisiloxane, 1,1,3,3,5,5,7,7-octaalkyltetrasiloxane, 1,1,1,3,5,7,7,7-octaakyltetrasiloxane, and 1,1,1,3,3,5,5,7,7-nonaalkyltetrasiloxane.

Representative examples of suitable cyclic hydrosilane compounds include, but are not limited to, 1,3,5-trialkylcyclotrisiloxane, 1,1,3,5-tetraalkylcyclotrisiloxane, 1,1,3,3,5-pentaalkylcyclotrisiloxane, 1,3,5,7-tetraalkylcyclotetrasiloxane, 1,1,3,5,7-pentaalkylcyclotetrasiloxane, 1,1,3,3,5,7-hexaalkylcyclotetrasiloxane, 1,1,3,5,5,7-hexaalkylcyclotetrasiloxane, 1,1,3,3,5,5,7-heptaalkylcyclotetrasiloxane, 1,3,5,7,9-pentaalkylcyclopentasiloxane, 1,1,3,5,7,9-hexaalkylcyclopentasiloxane, 1,1,3,3,5,7,9-heptaalkylcyclopentasiloxane, 1,1,3,5,5,7,9-heptaalkylcyclopentasiloxane, 1,1,3,3,5,5,7,9-octaalkylcyclopentasiloxane, 1,1,3,5,5,7,7,9-octaalkylcyclopentasiloxane, 1,1,3,3,5,5,7,7,9-nonaalkylcyclopentasiloxane, 1,3,5,7,9,11-hexaalkylcyclohexasiloxane, 1,1,3,5,7,9,11-heptaalkylcyclohexasiloxane, 1,1,3,3,5,7,9,11-octaalkylcyclohexasiloxane, 1,1,3,5,5,7,9,11-octaalkylcyclohexasiloxane, 1,1,3,5,7,9,11-octaalkylcyclohexasiloxane, 1,1,3,3,5,5,7,9,11-nonaalkylcyclohexasiloxane, 1,1,3,3,5,7,7,9,11-nonaalkylcyclohexasiloxane, 1,1,3,5,5,7,7,9,11-nonaalkylcyclohexasiloxane, 1,1,3,3,5,5,7,7,9,11-decaalkylcyclohexasiloxane, 1,1,3,3,5,5,7,9,9,11-decaalkylcyclohexasiloxane, 1,1,3,3,5,7,7,9,9,11-decaalkylcyclohexasiloxane, 1,1,3,5,5,7,7,9,9,11- decaalkylcyclohexasiloxane, and 1,1,3,3,5,5,7,7,9,9,9,11-undecaalkylcyclohexasiloxane.

Specific examples of suitable trihydrocarbyloxy silane compounds include, but are not limited to, trimethoxy silane, triethoxy silane, triphenoxy silane, dimethoxy ethoxysilane, dimethoxy phenoxysilane, diphenoxy ethoxy silane, and methoxy ethoxy phenoxysilane.

Specific examples of suitable hydrocarbyl dihydrocarbyloxy silane compounds include, but are not limited to, methyl dimethoxy silane, methyl diethoxy silane, methyl diphenoxy silane, methyl methoxy ethoxysilane, methyl methoxy phenoxysilane, methyl phenoxy ethoxy silane, ethyl dimethoxy silane, ethyl diethoxy silane, ethyl diphenoxy silane, ethyl methoxy ethoxysilane, ethyl methoxy phenoxysilane, ethyl phenoxy ethoxy silane, n-propyl dimethoxy silane, n-propyl diethoxy silane, n-propyl diphenoxy silane, n-propyl methoxy ethoxysilane, n-propyl methoxy phenoxysilane, n-propyl phenoxy ethoxy silane, isopropyl dimethoxy silane, isopropyl diethoxy silane, isopropyl diphenoxy silane, isopropyl methoxy ethoxysilane, isopropyl methoxy phenoxysilane, isopropyl phenoxy ethoxy silane, n-butyl dimethoxy silane, n-butyl diethoxy silane, n-butyl diphenoxy silane, n-butyl methoxy ethoxysilane, n-butyl methoxy phenoxysilane, n-butyl phenoxy ethoxy silane, t-butyl dimethoxy silane, t-butyl diethoxy silane, t-butyl diphenoxy silane, t-butyl methoxy ethoxysilane, t-butyl methoxy phenoxysilane, t-butyl phenoxy ethoxy silane, neopentyl dimethoxy silane, neopentyl diethoxy silane, neopentyl diphenoxy silane, neopentyl methoxy ethoxysilane, neopentyl methoxy phenoxysilane, neopentyl phenoxy ethoxy silane, n-pentyl dimethoxy silane, n-pentyl diethoxy silane, n-pentyl diphenoxy silane, n-pentyl methoxy ethoxysilane, n-pentyl methoxy phenoxysilane, n-pentyl phenoxy ethoxy silane, n-hexyl dimethoxy silane, n-hexyl diethoxy silane, n-hexyl diphenoxy silane, n-hexyl methoxy ethoxysilane, n-hexyl methoxy phenoxysilane, n-hexyl phenoxy ethoxy silane, benzyl dimethoxy silane, benzyl diethoxy silane, benzyl diphenoxy silane, benzyl methoxy ethoxysilane, benzyl methoxy phenoxysilane, benzyl phenoxy ethoxy silane, phenyl dimethoxy silane, phenyl diethoxy silane, phenyl diphenoxy silane, phenyl methoxy ethoxysilane, phenyl methoxy phenoxysilane, phenyl phenoxy ethoxy silane, cyclohexyl dimethoxy silane, cyclohexyl diethoxy silane, cyclohexyl diphenoxy silane, cyclohexyl methoxy ethoxysilane, cyclohexyl methoxy phenoxysilane, and cyclohexyl phenoxy ethoxy silane.

Specific examples of suitable dihydrocarbyl hydrocarbyloxy silane compounds include, but are not limited to, dimethyl methoxy silane, dimethyl ethoxy silane, dimethyl phenoxy silane, diethyl methoxy silane, diethyl ethoxy silane, diethyl phenoxy silane, di-n-propyl methoxy silane, di-n-propyl ethoxy silane, di-n-propyl phenoxy silane, diisopropyl methoxy silane, diisopropyl ethoxy silane, diisopropyl phenoxy silane, di-n-butyl methoxy silane, di-n-butyl ethoxy silane, di-n-butyl phenoxy silane, di-t-butyl methoxy silane, di-t-butyl ethoxy silane, di-t-butyl phenoxy silane, dineopentyl methoxy silane, dineopentyl ethoxy silane, dineopentyl phenoxy silane, di-n-pentyl methoxy silane, di-n-pentyl ethoxy silane, di-n-pentyl phenoxy silane, di-n-hexyl methoxy silane, di-n-hexyl ethoxy silane, di-n-hexyl phenoxy silane, dibenzyl methoxy silane, dibenzyl ethoxy silane, dibenzyl phenoxy silane, diphenyl methoxy silane, diphenyl ethoxy silane, diphenyl phenoxy silane, dicyclohexyl methoxy silane, dicyclohexyl ethoxy silane, dicyclohexyl phenoxy silane, methyl ethyl methoxy silane, methyl ethyl ethoxy silane, methyl ethyl phenoxy silane, methyl isopropyl methoxy silane, methyl isopropyl ethoxy silane, methyl isopropyl phenoxy silane, methyl phenyl methoxy silane, methyl phenyl ethoxy silane, methyl phenyl phenoxy silane, ethyl phenyl methoxy silane, ethyl phenyl ethoxy silane, ethyl phenyl phenoxy silane, isopropyl phenyl methoxy silane, isopropyl phenyl ethoxy silane, isopropyl phenyl phenoxy silane, isopropyl ethyl methoxy silane, isopropyl ethyl ethoxy silane, isopropyl ethyl phenoxy silane, methyl cyclohexyl methoxy silane, methyl cyclohexyl ethoxy silane, methyl cyclohexyl phenoxy silane, ethyl cyclohexyl methoxy silane, ethyl cyclohexyl ethoxy silane, and ethyl cyclohexyl phenoxy silane.

Specific examples of suitable trisilyloxy silane compounds include, but are not limited to, tris(dimethylsilyloxy) silane, tris(trimethylsilyloxy) silane, tris(diethylsilyloxy) silane, tris(triethylsilyloxy) silane, tris(diisopropylsilyloxy) silane, tris(triisopropylsilyloxy) silane, tris[(trimethylsiloxy)dimethylsiloxy]silane, tris[(dimethylsiloxy)dimethylsiloxy] silane, bis(dimethylsilyloxy)[(trimethylsiloxy)dimethylsiloxy]silane, bis(dimethylsilyloxy)[(dimethylsiloxy)dimethylsiloxy]silane, bis(trimethylsilyloxy) [(trimethylsiloxy)dimethylsiloxy]silane, and bis(trimethylsilyloxy) [(dimethylsiloxy)dimethylsiloxy]silane.

Specific examples of suitable hydrocarbyl disilyloxy silane compounds include, but are not limited to, methyl bis(dimethylsilyloxy)silane, methyl bis(trimethylsilyloxy) silane, methyl bis(diethylsilyloxy) silane, methyl bis(triethylsilyloxy) silane, methyl bis(diisopropylsilyloxy) silane, methyl bis(triisopropylsilyloxy)silane, methyl bis[(trimethylsiloxy)dimethylsiloxy]silane, methyl bis[(dimethylsiloxy)dimethylsiloxy]silane, methyl (dimethylsilyloxy) [(trimethylsiloxy)dimethylsiloxy]silane, methyl (dimethylsilyloxy) [(dimethylsiloxy)dimethylsiloxy]silane, methyl (trimethylhydrosilyloxy) [(trimethylsiloxy)dimethylsiloxy]silane, methyl (trimethylsilyloxy) [(dimethylsiloxy)dimethylsiloxy]silane, ethyl bis(dimethylsilyloxy) silane, ethyl bis(trimethylsilyloxy) silane, ethyl bis(diethylsilyloxy) silane, ethyl bis(triethylsilyloxy) silane, ethyl bis(diisopropylsilyloxy) silane, ethyl bis(triisopropylsilyloxy) silane, ethyl bis[(trimethylsiloxy)dimethylsiloxy]silane, ethyl bis[(dimethylsiloxy)dimethylsiloxy]silane, ethyl (dimethylsilyloxy) [(trimethylsiloxy)dimethylsiloxy]silane, ethyl (dimethylsilyloxy) [(dimethylsiloxy)dimethylsiloxy]silane, ethyl (trimethylhydrosilyloxy) [(trimethylsiloxy)dimethylsiloxy]silane, ethyl (trimethylsilyloxy) [(dimethylsiloxy)dimethylsiloxy]silane, n-propyl bis(dimethylsilyloxy) silane, n-propyl bis(trimethylsilyloxy) silane, n-propyl bis(diethylsilyloxy) silane, n-propyl bis(triethylsilyloxy) silane, n-propyl bis(diisopropylsilyloxy) silane, n-propyl bis(triisopropylsilyloxy) silane, n-propyl bis[(trimethylsiloxy)dimethylsiloxy]silane, n-propyl bis[(dimethylsiloxy)dimethylsiloxy]silane, n-propyl (dimethylsilyloxy) [(trimethylsiloxy)dimethylsiloxy]silane, n-propyl (dimethylsilyloxy) [(dimethylsiloxy)dimethylsiloxy]silane, n-propyl (trimethylhydrosilyloxy) [(trimethylsiloxy)dimethylsiloxy]silane, n-propyl (trimethylsilyloxy) [(dimethylsiloxy)dimethylsiloxy]silane, isopropyl bis(dimethylsilyloxy) silane, isopropyl bis(trimethylsilyloxy) silane, isopropyl bis(diethylsilyloxy) silane, isopropyl bis(triethylsilyloxy) silane, isopropyl bis(diisopropylsilyloxy) silane, isopropyl bis(triisopropylsilyloxy) silane, isopropyl bis[(trimethylsiloxy)dimethylsiloxy]silane, isopropyl bis [(dimethylsiloxy)dimethylsiloxy]silane, isopropyl (dimethylsilyloxy) [(trimethylsiloxy)dimethylsiloxy]silane, isopropyl (dimethylsilyloxy) [(dimethylsiloxy)dimethylsiloxy] silane, isopropyl (trimethylhydrosilyloxy) [(trimethylsiloxy)dimethylsiloxy]silane, isopropyl (trimethylsilyloxy) [(dimethylsiloxy)dimethylsiloxy]silane, n-butyl bis(dimethylsilyloxy) silane, n-butyl bis(trimethylsilyloxy) silane, n-butyl bis(diethylsilyloxy) silane, n-butyl bis(triethylsilyloxy) silane, n-butyl bis(diisopropylsilyloxy) silane, n-butyl bis(triisopropylsilyloxy) silane, n-butyl bis[(trimethylsiloxy)dimethylsiloxy]silane, n-butyl bis[(dimethylsiloxy)dimethylsiloxy]silane, n-butyl (dimethylsilyloxy) [(trimethylsiloxy)dimethylsiloxy]silane, n-butyl (dimethylsilyloxy) [(dimethylsiloxy)dimethylsiloxy]silane, n-butyl (trimethylhydrosilyloxy) [(trimethylsiloxy)dimethylsiloxy]silane, n-butyl (trimethylsilyloxy) [(dimethylsiloxy)dimethylsiloxy]silane, t-butyl bis(dimethylsilyloxy) silane, t-butyl bis(trimethylsilyloxy) silane, t-butyl bis(diethylsilyloxy) silane, t-butyl bis(triethylsilyloxy) silane, t-butyl bis(diisopropylsilyloxy) silane, t-butyl bis(triisopropylsilyloxy) silane, t-butyl bis[(trimethylsiloxy)dimethylsiloxy]silane, t-butyl bis[(dimethylsiloxy)dimethylsiloxy]silane, t-butyl (dimethylsilyloxy) [(trimethylsiloxy)dimethylsiloxy]silane, t-butyl (dimethylsilyloxy) [(dimethylsiloxy)dimethylsiloxy] silane, t-butyl (trimethylhydrosilyloxy) [(trimethylsiloxy)dimethylsiloxy]silane, t-butyl (trimethylsilyloxy) [(dimethylsiloxy)dimethylsiloxy]silane, neopentyl bis(dimethylsilyloxy) silane, neopentyl bis(trimethylsilyloxy) silane, neopentyl bis(diethylsilyloxy) silane, neopentyl bis(triethylsilyloxy) silane, neopentyl bis(diisopropylsilyloxy) silane, neopentyl bis(triisopropylsilyloxy) silane, neopentyl bis[(trimethylsiloxy)dimethylsiloxy]silane, neopentyl bis[(dimethylsiloxy)dimethylsiloxy]silane, neopentyl (dimethylsilyloxy) [(trimethylsiloxy)dimethylsiloxy]silane, neopentyl (dimethylsilyloxy) [(dimethylsiloxy)dimethylsiloxy] silane, neopentyl (trimethylhydrosilyloxy) [(trimethylsiloxy)dimethylsiloxy]silane, neopentyl (trimethylsilyloxy) [(dimethylsiloxy)dimethylsiloxy]silane, n-pentyl bis(dimethylsilyloxy) silane, n-pentyl bis(trimethylsilyloxy) silane, n-pentyl bis(diethylsilyloxy) silane, n-pentyl bis(triethylsilyloxy) silane, n-pentyl bis(diisopropylsilyloxy) silane, n-pentyl bis(triisopropylsilyloxy) silane, n-pentyl bis[(trimethylsiloxy)dimethylsiloxy]silane, n-pentyl bis[(dimethylsiloxy)dimethylsiloxy]silane, n-pentyl (dimethylsilyloxy) [(trimethylsiloxy)dimethylsiloxy]silane, n-pentyl (dimethylsilyloxy) [(dimethylsiloxy)dimethylsiloxy]silane, n-pentyl (trimethylhydrosilyloxy) [(trimethylsiloxy)dimethylsiloxy]silane, n-pentyl (trimethylsilyloxy) [(dimethylsiloxy)dimethylsiloxy]silane, n-hexyl bis(dimethylsilyloxy) silane, n-hexyl bis(trimethylsilyloxy) silane, n-hexyl bis(diethylsilyloxy) silane, n-hexyl bis(triethylsilyloxy) silane, n-hexyl bis(diisopropylsilyloxy) silane, n-hexyl bis(triisopropylsilyloxy) silane, n-hexyl bis[(trimethylsiloxy)dimethylsiloxy]silane, n-hexyl bis[(dimethylsiloxy)dimethylsiloxy]silane, n-hexyl (dimethylsilyloxy) [(trimethylsiloxy)dimethylsiloxy]silane, n-hexyl (dimethylsilyloxy) [(dimethylsiloxy)dimethylsiloxy]silane, n-hexyl (trimethylhydrosilyloxy) [(trimethylsiloxy)dimethylsiloxy]silane, n-hexyl (trimethylsilyloxy) [(dimethylsiloxy)dimethylsiloxy]silane, benzyl bis(dimethylsilyloxy) silane, benzyl bis(trimethylsilyloxy) silane, benzyl bis(diethylsilyloxy) silane, benzyl bis(triethylsilyloxy) silane, benzyl bis(diisopropylsilyloxy) silane, benzyl bis(triisopropylsilyloxy) silane, benzyl bis[(trimethylsiloxy)dimethylsiloxy]silane, benzyl bis[(dimethylsiloxy)dimethylsiloxy]silane, benzyl (dimethylsilyloxy) [(trimethylsiloxy)dimethylsiloxy]silane, benzyl (dimethylsilyloxy) [(dimethylsiloxy)dimethylsiloxy] silane, benzyl (trimethylhydrosilyloxy) [(trimethylsiloxy)dimethylsiloxy]silane, benzyl (trimethylsilyloxy) [(dimethylsiloxy)dimethylsiloxy]silane, phenyl bis(dimethylsilyloxy) silane, phenyl bis(trimethylsilyloxy) silane, phenyl bis(diethylsilyloxy) silane, phenyl bis(triethylsilyloxy) silane, phenyl bis(diisopropylsilyloxy) silane, phenyl bis(triisopropylsilyloxy) silane, phenyl bis[(trimethylsiloxy)dimethylsiloxy]silane, phenyl bis[(dimethylsiloxy)dimethylsiloxy]silane, phenyl (dimethylsilyloxy) [(trimethylsiloxy)dimethylsiloxy]silane, phenyl (dimethylsilyloxy) [(dimethylsiloxy)dimethylsiloxy]silane, phenyl (trimethylhydrosilyloxy) [(trimethylsiloxy)dimethylsiloxy]silane, phenyl (trimethylsilyloxy) [(dimethylsiloxy)dimethylsiloxy]silane, cyclohexyl bis(dimethylsilyloxy) silane, cyclohexyl bis(trimethylsilyloxy) silane, cyclohexyl bis(diethylsilyloxy) silane, cyclohexyl bis(triethylsilyloxy) silane, cyclohexyl bis(diisopropylsilyloxy) silane, cyclohexyl bis(triisopropylsilyloxy) silane, cyclohexyl bis[(trimethylsiloxy)dimethylsiloxy]silane, cyclohexyl bis[(dimethylsiloxy)dimethylsiloxy]silane, cyclohexyl (dimethylsilyloxy) [(trimethylsiloxy)dimethylsiloxy]silane, cyclohexyl (dimethylsilyloxy)[(dimethylsiloxy)dimethylsiloxy]silane, cyclohexyl (trimethylhydrosilyloxy) [(trimethylsiloxy)dimethylsiloxy]silane, and cyclohexyl (trimethylsilyloxy) [(dimethylsiloxy)dimethylsiloxy]silane.

Specific examples of suitable dihydrocarbyl silyloxy silane compounds include, but are not limited to, dimethyl dimethylsilyloxysilane, dimethyl trimethylsilyloxysilane, dimethyl diethylsilyloxysilane, dimethyl triethylsilyloxysilane, dimethyl diisopropylsilyloxysilane, dimethyl triisopropylsilyloxysilane, dimethyl [(trimethylsiloxy) dimethyl siloxy]silane, dimethyl [(dimethylsiloxy) dimethyl siloxy] silane, diethyl dimethylsilyloxysilane, diethyl trimethylsilyloxysilane, diethyl diethylsilyloxysilane, diethyl triethylsilyloxysilane, diethyl diisopropylsilyloxysilane, diethyl triisopropylsilyloxysilane, diethyl [(trimethylsiloxy) dimethyl siloxy]silane, diethyl [(dimethylsiloxy) dimethyl siloxy]silane, di-n-propyl dimethylsilyloxysilane, di-n-propyl trimethylsilyloxysilane, di-n-propyl diethylsilyloxysilane, di-n-propyl triethylsilyloxysilane, di-n-propyl diisopropylsilyloxysilane, di-n-propyl triisopropylsilyloxysilane, di-n-propyl [(trimethylsiloxy) dimethyl siloxy]silane, di-n-propyl [(dimethylsiloxy) dimethyl siloxy]silane, diisopropyl dimethylsilyloxysilane, diisopropyl trimethylsilyloxysilane, diisopropyl diethylsilyloxysilane, diisopropyl triethylsilyloxysilane, diisopropyl diisopropylsilyloxysilane, diisopropyl triisopropylsilyloxysilane, diisopropyl [(trimethylsiloxy) dimethyl siloxy]silane, diisopropyl [(dimethylsiloxy) dimethyl siloxy]silane, di-n-butyl dimethylsilyloxysilane, di-n-butyl trimethylsilyloxysilane, di-n-butyl diethylsilyloxysilane, di-n-butyl triethylsilyloxysilane, di-n-butyl diisopropylsilyloxysilane, di-n-butyl triisopropylsilyloxysilane, di-n-butyl [(trimethylsiloxy) dimethyl siloxy]silane, di-n-butyl [(dimethylsiloxy) dimethyl siloxy]silane, di-t-butyl dimethylsilyloxysilane, di-t-butyl trimethylsilyloxysilane, di-t-butyl diethylsilyloxysilane, di-t-butyl triethylsilyloxysilane, di-t-butyl diisopropylsilyloxysilane, di-t-butyl triisopropylsilyloxysilane, di-t-butyl [(trimethylsiloxy) dimethyl siloxy]silane, di-t-butyl [(dimethylsiloxy) dimethyl siloxy] silane, dineopentyl dimethylsilyloxysilane, dineopentyl trimethylsilyloxysilane, dineopentyl diethylsilyloxysilane, dineopentyl triethylsilyloxysilane, dineopentyl diisopropylsilyloxysilane, dineopentyl triisopropylsilyloxysilane, dineopentyl [(trimethylsiloxy) dimethyl siloxy]silane, dineopentyl [(dimethylsiloxy) dimethyl siloxy]silane, di-n-pentyl dimethylsilyloxysilane, di-n-pentyl trimethylsilyloxysilane, di-n-pentyl diethylsilyloxysilane, di-n-pentyl triethylsilyloxysilane, di-n-pentyl diisopropylsilyloxysilane, di-n-pentyl triisopropylsilyloxysilane, di-n-pentyl [(trimethylsiloxy) dimethyl siloxy]silane, di-n-pentyl [(dimethylsiloxy) dimethyl siloxy]silane, di-n-hexyl dimethylsilyloxysilane, di-n-hexyl trimethylsilyloxysilane, di-n-hexyl diethylsilyloxysilane, di-n-hexyl triethylsilyloxysilane, di-n-hexyl diisopropylsilyloxysilane, di-n-hexyl triisopropylsilyloxysilane, di-n-hexyl [(trimethylsiloxy) dimethyl siloxy]silane, di-n-hexyl [(dimethylsiloxy) dimethyl siloxy]silane, dibenzyl dimethylsilyloxysilane, dibenzyl trimethylsilyloxysilane, dibenzyl diethylsilyloxysilane, dibenzyl triethylsilyloxysilane, dibenzyl diisopropylsilyloxysilane, dibenzyl triisopropylsilyloxysilane, dibenzyl [(trimethylsiloxy) dimethyl siloxy]silane, dibenzyl [(dimethylsiloxy) dimethyl siloxy]silane, diphenyl dimethylsilyloxysilane, diphenyl trimethylsilyloxysilane, diphenyl diethylsilyloxysilane, diphenyl triethylsilyloxysilane, diphenyl diisopropylsilyloxysilane, diphenyl triisopropylsilyloxysilane, diphenyl [(trimethylsiloxy) dimethyl siloxy]silane, diphenyl [(dimethylsiloxy) dimethyl siloxy]silane, dicyclohexyl dimethylsilyloxysilane, dicyclohexyl trimethylsilyloxysilane, dicyclohexyl diethylsilyloxysilane, dicyclohexyl triethylsilyloxysilane, dicyclohexyl diisopropylsilyloxysilane, dicyclohexyl triisopropylsilyloxysilane, dicyclohexyl [(trimethylsiloxy) dimethyl siloxy]silane, dicyclohexyl [(dimethylsiloxy) dimethyl siloxy]silane, methylethyl dimethylsilyloxysilane, methylethyl trimethylsilyloxysilane, methylethyl diethylsilyloxysilane, methylethyl triethylsilyloxysilane, methylethyl diisopropylsilyloxysilane, methylethyl triisopropylsilyloxysilane, methylethyl [(trimethylsiloxy) dimethyl siloxy]silane, methylethyl [(dimethylsiloxy) dimethyl siloxy]silane, methylisopropyl dimethylsilyloxysilane, methylisopropyl trimethylsilyloxysilane, methylisopropyl diethylsilyloxysilane, methylisopropyl triethylsilyloxysilane, methylisopropyl diisopropylsilyloxysilane, methylisopropyl triisopropylsilyloxysilane, methylisopropyl [(trimethylsiloxy) dimethyl siloxy]silane, methylisopropyl [(dimethylsiloxy) dimethyl siloxy]silane, methylphenyl dimethylsilyloxysilane, methylphenyl trimethylsilyloxysilane, methylphenyl diethylsilyloxysilane, methylphenyl triethylsilyloxysilane, methylphenyl diisopropylsilyloxysilane, methylphenyl triisopropylsilyloxysilane, methylphenyl [(trimethylsiloxy) dimethyl siloxy]silane, methylphenyl [(dimethylsiloxy) dimethyl siloxy]silane, ethyl phenyl dimethylsilyloxysilane, ethyl phenyl trimethylsilyloxysilane, ethyl phenyl diethylsilyloxysilane, ethyl phenyl triethylsilyloxysilane, ethyl phenyl diisopropylsilyloxysilane, ethyl phenyl triisopropylsilyloxysilane, ethyl phenyl [(trimethylsiloxy) dimethyl siloxy]silane, ethyl phenyl [(dimethylsiloxy) dimethyl siloxy]silane, isopropyl phenyl dimethylsilyloxysilane, isopropyl phenyl trimethylsilyloxysilane, isopropyl phenyl diethylsilyloxysilane, isopropyl phenyl triethylsilyloxysilane, isopropyl phenyl diisopropylsilyloxysilane, isopropyl phenyl triisopropylsilyloxysilane, isopropyl phenyl [(trimethylsiloxy) dimethyl siloxy]silane, isopropyl phenyl [(dimethylsiloxy) dimethyl siloxy]silane, isopropyl ethyl dimethylsilyloxysilane, isopropyl ethyl trimethylsilyloxysilane, isopropyl ethyl diethylsilyloxysilane, isopropyl ethyl triethylsilyloxysilane, isopropyl ethyl diisopropylsilyloxysilane, isopropyl ethyl triisopropylsilyloxysilane, isopropyl ethyl [(trimethylsiloxy) dimethyl siloxy]silane, isopropyl ethyl [(dimethylsiloxy) dimethyl siloxy]silane, methylcyclohexyl dimethylsilyloxysilane, methylcyclohexyl trimethylsilyloxysilane, methylcyclohexyl diethylsilyloxysilane, methylcyclohexyl triethylsilyloxysilane, methylcyclohexyl diisopropylsilyloxysilane, methylcyclohexyl triisopropylsilyloxysilane, methylcyclohexyl [(trimethylsiloxy) dimethyl siloxy]silane, methylcyclohexyl [(dimethylsiloxy) dimethyl siloxy]silane, ethyl cyclohexyl dimethylsilyloxysilane, ethyl cyclohexyl trimethylsilyloxysilane, ethyl cyclohexyl diethylsilyloxysilane, ethyl cyclohexyl triethylsilyloxysilane, ethyl cyclohexyl diisopropylsilyloxysilane, ethyl cyclohexyl triisopropylsilyloxysilane, ethyl cyclohexyl [(trimethylsiloxy) dimethyl siloxy]silane, ethyl cyclohexyl [(dimethylsiloxy) dimethyl siloxy]silane, trifluoropropyl tris(dimethylsiloxy) silane, trichloropropyl tris (dimethylsiloxy) silane, bis(trifluoropropyl) bis (dimethylsiloxy) silane, bis(trichloropropyl) bis (dimethylsiloxy)silane, trifluoropropyl tris(dimethylsiloxy) silane, tris(trichloropropyl) bis(dimethylsiloxy) silane, trifluoropropyl tris(diethylsiloxy) silane, trichloropropyl tris (diethylsiloxy) silane, bis(trifluoropropyl) bis(diethylsiloxy) silane, bis(trichloropropyl) bis(diethylsiloxy)silane, trifluoropropyl tris(diethylsiloxy) silane, and tris(trichloropropyl) bis(diethylsiloxy) silane.

Specific examples of suitable siloxane compounds include, but are not limited to, 1,1,3,3-tetramethyldisiloxane, 1,1,1,3,3,-butamethyldisiloxane, 1,1,3,3,5,5-hexamethyltrisiloxane, 1,1,1,3,3,5,5-heptamethyltrisiloxane, 1,1,3,3,5,5,7,7-octamethyltetrasiloxane, 1,1,1,3,5,7,7,7-octaakyltetrasiloxane, 1,1,1,3,3,5,5,7,7-nonamethyltetrasiloxane, 1,1,3,3-tetraethyldisiloxane, 1,1,1,3,3,-butaethyldisiloxane, 1,1,3,3,5,5-hexaethyltrisiloxane, 1,1,1,3,3,5,5-heptaethyltrisiloxane, 1,1,3,3,5,5,7,7-octaethyltetrasiloxane, 1,1,1,3,5,7,7,7-octaakyltetrasiloxane, and 1,1,1,3,3,5,5,7,7-nonaethyltetrasiloxane.

Specific examples of suitable cyclic hydrosilane compounds include, but are not limited to, 1,3,5-trimethylcyclotrisiloxane, 1,1,3,5-tetramethylcyclotrisiloxane, 1,1,3,3,5-pentamethylcyclotrisiloxane, 1,3,5,7-tetramethylcyclotetrasiloxane, 1,1,3,5,7-pentamethylcyclotetrasiloxane, 1,1,3,3,5,7-hexamethylcyclotetrasiloxane, 1,1,3,5,5,7-hexamethylcyclotetrasiloxane, 1,1,3,3,5,5,7-heptamethylcyclotetrasiloxane, 1,3,5,7,9-pentamethylcyclopentasiloxane, 1,1,3,5,7,9-hexamethylcyclopentasiloxane, 1,1,3,3,5,7,9-heptamethylcyclopentasiloxane, 1,1,3,5,5,7,9-heptamethylcyclopentasiloxane, 1,1,3,3,5,5,7,9-octamethylcyclopentasiloxane, 1,1,3,5,5,7,7,9-octamethylcyclopentasiloxane, 1,1,3,5,5,7,9,9-octamethylcyclopentasiloxane, 1,1,3,3,5,5,7,7,9-nonamethylcyclopentasiloxane, 1,3,5,7,9,11-hexamethylcyclohexasiloxane, 1,1,3,5,7,9,11-heptamethylcyclohexasiloxane, 1,1,3,3,5,7,9,11-octamethylcyclohexasiloxane, 1,1,3,5,5,7,7,9,11-octamethylcyclohexasiloxane, 1,1,3,3,5,5,7,9,11-octamethylcyclohexasiloxane, 1,1,3,3,5,7,7,9,11-nonamethylcyclohexasiloxane, 1,1,3,3,5,7,9,9,11-nonamethylcyclohexasiloxane, 1,1,3,5,5,7,7,9,11-nonamethylcyclohexasiloxane, 1,1,3,3,5,5,7,7,9,11-nonamethylcyclohexasiloxane, 1,1,3,3,5,5,7,9,9,11-decamethylcyclohexasiloxane, 1,1,3,3,5,7,7,9,9,11-decamethylcyclohexasiloxane, 1,1,3,5,5,7,7,9,9,11-decamethylcyclohexasiloxane, 1,1,3,3,5,5,7,7,9,9,11-undecamethylcyclohexasiloxane, 1,3,5-triethylcyclotrisiloxane, 1,1,3,5-tetraethylcyclotrisiloxane, 1,1,3,3,5-pentaethylcyclotrisiloxane, 1,3,5,7-tetraethylcyclotetrasiloxane, 1,1,3,5,7-pentaethylcyclotetrasiloxane, 1,1,3,3,5,7-hexaethylcyclotetrasiloxane, 1,1,3,5,5,7-hexaethylcyclotetrasiloxane, 1,1,3,3,5,5,7-heptaethylcyclotetrasiloxane, 1,3,5,7,9-pentaethylcyclopentasiloxane, 1,1,3,5,7,9-hexaethylcyclopentasiloxane, 1,1,3,3,5,7,9-heptaethylcyclopentasiloxane, 1,1,3,5,5,7,9-heptaethylcyclopentasiloxane, 1,1,3,3,5,5,7,9-octaethylcyclopentasiloxane, 1,1,3,5,5,7,7,9-octaethylcyclopentasiloxane, 1,1,3,5,5,7,9,9-octaethylcyclopentasiloxane, 1,1,3,3,5,5,7,7,9-nonaethylcyclopentasiloxane, 1,3,5,7,9,11- hexaethylcyclohexasiloxane, 1,1,3,5,7,9,11-heptaethylcyclohexasiloxane, 1,1,3,3,5,7,9,11-octaethylcyclohexasiloxane, 1,1,3,5,5,7,9,11-octaethylcyclohexasiloxane, 1,1,3,5,7,7,9,11-octaethylcyclohexasiloxane, 1,1,3,3,5,5,7,9,11-nonaethylcyclohexasiloxane, 1,1,3,5,7,7,9,11-nonaethylcyclohexasiloxane, 1,1,3,5,7,9,9,11-nonaethylcyclohexasiloxane, 1,1,3,5,5,7,7,9,11-nonaethylcyclohexasiloxane, 1,1,3,3,5,5,7,7,9,11-decaethylcyclohexasiloxane, 1,1,3,3,5,5,7,9,9,11-decaethylcyclohexasiloxane, 1,1,3,3,5,7,7,9,9,11-decaethylcyclohexasiloxane, 1,1,3,5,5,7,7,9,9,11-decaethylcyclohexasiloxane, and 1,1,3,3,5,5,7,7,9,9,11-undecaethylcyclohexasiloxane.

Quenching

In one or more embodiments, optionally after the reaction between the reactive polymer and the functionalizing agent has been accomplished or completed, a quenching agent can be added to the polymerization mixture in order to protonate the reaction product between the reactive polymer and the functionalizing agent, inactivate any residual reactive polymer chains, and/or inactivate the catalyst or catalyst components. The quenching agent may include a protic compound, which includes, but is not limited to, an alcohol, a carboxylic acid, an inorganic acid, water, or a mixture thereof. In particular embodiments, quenching with an alcohol, such as isopropanol, is employed since it has been observed that the use of isopropyl alcohol contributes to certain desirable properties in the final polymer, such as desirable cold flow. An antioxidant such as 2,6-di-tert-butyl-4-methylphenol may be added along with, before, or after the addition of the quenching agent. The amount of the antioxidant employed may be in the range of 0.2% to 1% by weight of the polymer product. Additionally, the polymer product can be oil extended by adding an oil to the polymer, which may be in the form of a polymer cement or polymer dissolved or suspended in monomer. Practice of the present invention does not limit the amount of oil that may be added, and therefore conventional amounts may be added (e.g., 5-50 phr). Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Polymer Recovery

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Silane-Functional Cis-1,4-Polydiene Polymer

The cis-1,4-polydiene and the hydrosilane (and optionally the functionalizing agent) are believed to react to produce a novel functionalized polymer, wherein the residue of the hydrosilane is imparted on the cis-1,4-polydiene. The exact chemical structure of the functionalized polymer produced in every embodiment may not be known with a great degree of certainty, particularly as the structure relates to the residue imparted to the cis-1,4-polydiene by the hydrosilane and optionally the functionalizing agent. Indeed, it is speculated that the structure of the functionalized polymer may depend upon various factors such as the conditions employed to prepare the cis-1,4-polydiene (e.g., the type and amount of the catalyst) and the conditions employed to react the hydrosilane (and optionally the functionalizing agent) with the cis-1,4-polydiene (e.g., the type and amount of the functionalizing agent). The functionalized polymer resulting from the reaction between the cis-1,4-polydiene and the hydrosilane can be protonated or further modified.

In one or more embodiments, one of the products resulting from the reaction between the cis-1,4-polydiene and the hydrosilane may be a functionalized polymer defined by the following formula:

where x is an integer from 0 to 3, each R is individually a halogen atom or a monovalent organic group, or where two or more R groups join to form a polyvalent organic group, and π is a cis-1,4-polydiene polymer chain as described above.

In certain embodiments, where the hydrosilane compound includes a hydrocarbyloxy group or a silyloxy group, the polymer functionalized with the hydrosilane (i.e. the silane-functionalized polymer) may undergo a condensation reaction with another hydrocarbyloxy group or a silyloxy group on a second silane-functionalized polymer, thereby coupling the cis-1,4-polydiene polymers. In one or more embodiments, the occurrence of a coupling reaction of a silane functionality may be determined through gel permeation chromatography (GPC). In one or more embodiments, the coupled polymer is a higher molecular weight species that has a number average molecular weight is at least 20 times larger, in other embodiments at least 50 times larger and in other embodiments at least 100 times larger than the number average molecular weight of the predominant species of the cis-1,4-polydiene polymer.

In one or more embodiments, one of the products resulting from the reaction between the cis-1,4-polydiene and the hydrosilane, particularly after the silane-functionalized polymer couples with a second silane-functionalized polymer, may be a functionalized polymer defined by the following formula

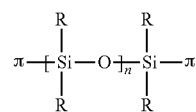

where n is an integer from 0 to 8, each R is individually a hydrogen atom, halogen atom, or a monovalent organic group, and each π is a cis-1,4-polydiene polymer chain as described above. In one or more embodiments, n may be in integer from 1 to 6, and in other embodiments from 2 to 4.

In one or more embodiments, the silane-functionalized polymer may be characterized by the number silane-functional groups per cis-1,4-polydiene polymer. In one or more embodiments, the average number of silane-functional groups on the cis-1,4-polydiene polymer may be from about 1 to about 8, in other embodiments about 2 to about 6, and in other embodiments about 3 to about 4 silane-functional groups per polymer.

INDUSTRIAL APPLICABILITY

Advantageously, the polymers of this invention are particularly useful in preparing rubber compositions that can be used to manufacture tire components. Rubber compounding techniques and the additives employed therein are generally disclosed in *The Compounding and Vulcanization of Rubber, in Rubber Technology* ($2^{nd}$ Ed. 1973).

The rubber compositions can be prepared by using the polymers alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the polymer of this invention and silica in the substantial absence of coupling agents and shielding agents.

The rubber compositions prepared from the polymers of this invention are particularly useful for forming tire components such as treads, subtreads, sidewalls, body ply skims, bead filler, and the like. Preferably, the polymers of this invention are employed in tread and sidewall formulations. In one or more embodiments, these tread or sidewall formulations may include from about 10% to about 100% by weight, in other embodiments from about 35% to about 90% by weight, and in other embodiments from about 50% to about 80% by weight of the polymer based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Control 1

In this example, 1,3-butadiene was polymerized into cis-1,4-polybutadiene by a batch polymerization process. The polymerization reactor consisted of a two-gallon stainless cylinder equipped with a mechanical agitator (shaft and blades) capable of mixing high viscosity polymer cement. The reactor was also equipped with a water jacket to which could be supplied water with a controlled temperature. The jacket temperature was set to 100° F. To the reactor were added 3.49 lbs. of anhydrous hexanes and 6.51 lbs. of a 21.5 wt. % solution of butadiene in hexanes. 45.1 mL of 1.07 M triisobutylaluminum in hexane was charged into the reactor followed by the addition of 2.3 mL of 1.21 M neodymium (III) versatate in hexane. After the mixture inside the reactor was allowed to age for 5 minutes, the polymerization was started by charging 2.33 mL of 1.08 M ethylaluminum dichloride in hexane into the reactor and the temperature of the jacket was increased to 180° F. After 60 minutes from the start of the polymerization, the jacket temperature was decreased to 40° F. After an additional 20 minutes a portion of the polymer cement was dropped from the reactor into two, nitrogen purged glass bottles. The polymer was quenched with isopropanol to provide an unmodified polymer sample. The polymer was coagulated in 8 L isopropanol containing 15 g of 2,6-di-tert-butyl-4-methylphenol. The coagulated polymer was drum-dried. The yield of the polymer was 91.57 g (92.9% conversion). The Mooney viscosity ($ML_{1+4}$) of the polymer was determined to be 21.1 at 100° C. by using a Monsanto Mooney viscometer with a large rotor, a one-minute warm-up time, and a four-minute running time. As determined by gel permeation chromatography (GPC), the polymer had a number average molecular weight ($M_n$) of 64,000 g/mole, a weight average molecular weight ($M_w$) of 227,000 g/mole, and a molecular weight distribution ($M_w/M_n$) of 3.5. The infrared spectroscopic analysis of the polymer indicated a cis-1,4-linkage content of 95.1%, a trans-1,4-linkage content of 4.13%, and a 1,2-linkage content of 0.8%.

Example 1

Two additional bottles of polymer cement were prepared as in the control. To each bottle was added enough neat $(EtO)_3SiH$ to constitute 25 equiv. per Nd (~0.43 mL per bottle). The bottles were placed in an agitating water bath held at a temperature of 65° C. for 30 minutes. The polymer was quenched with isopropanol. The polymer was coagulated in 8 L isopropanol containing 15 g of 2,6-di-tert-butyl-4-methylphenol. The coagulated polymer was drum-dried. The yield of the polymer was 88.87 g. The resulting polymer had the following properties: $ML_{1+4}$: 37.1, base $M_n$: 68,000 g/mole, base $M_w$: 202,000 g/mole, $M_w/M_n$: 3.0, cis-1,4-linkage: 95.0%, trans-1,4-linkage: 4.2%, and 1,2-linkage: 0.8%. In addition there was a higher molecular weight species present with an $M_n$ of approximately 27,000,000 which constituted 1.0% of the polymer.

Example 2

Two additional bottles of polymer cement were prepared as in the control. To each bottle was added enough neat $(EtO)_3SiH$ to constitute 50 equiv. per Nd (~0.90 mL per bottle). The bottles were placed in an agitating water bath held at a temperature of 65° C. for 30 minutes. The polymer was quenched with isopropanol. The polymer was coagulated in 8 L isopropanol containing 15 g of 2,6-di-tert-butyl-4-methylphenol. The coagulated polymer was drum-dried. The yield of the polymer was 90.56 g. The resulting polymer had the following properties: $ML_{1+4}$: 40.4, base $M_n$: 71,000 g/mole, base $M_w$: 191,000 g/mole, $M_w/M_n$: 2.7, cis-1,4-linkage: 94.8%, trans-1,4-linkage: 4.4%, and 1,2-linkage: 0.8%. In addition there was a higher molecular weight species present with an $M_n$ of approximately 29,000,000 which constituted 1.5% of the polymer.

Example 3

Two additional bottles of polymer cement were prepared as in the control. To each bottle was added enough neat $(EtO)_3SiH$ to constitute 100 equiv. per Nd (~1.75 mL per bottle). The bottles were placed in an agitating water bath held at a temperature of 65° C. for 30 minutes. The polymer was quenched with isopropanol. The polymer was coagulated in 8 L isopropanol containing 15 g of 2,6-di-tert-butyl-4-methylphenol. The coagulated polymer was drum-dried. The yield of the polymer was 90.56 g. The resulting polymer had the following properties: $ML_{1+4}$: 52.3, base $M_n$: 63,000 g/mole, base $M_w$: 197,000 g/mole, $M_w/M_n$: 3.1, cis-1,4-linkage: 95.0%, trans-1,4-linkage: 4.2%, and 1,2-linkage: 0.8%. In addition there was a higher molecular weight species present with an $M_n$ of approximately 73,000,000 which constituted 1.6% of the polymer.

Comparative Example 1

In this example, 1,3-butadiene was polymerized into cis-1,4-polybutadiene by a batch polymerization process. The polymerization reactor consisted of a nitrogen purged 750 mL glass bottle equipped with a rubber septum and crimped metal cap which had two holes to allow for the addition of reagents. To the bottle were added 99.7 g of anhydrous hexanes and 233.6 g of a 21.4 wt. % solution of butadiene in hexanes. 2.55 mL of 1.00 M triisobutylaluminum in hexane was charged into the bottle followed by the addition of 1.57 mL of 0.054 M neodymium(III) versatate in hexane. The polymerization was started by charging 0.24 mL of 1.08 M diethylaluminum chloride in hexane into the bottle and the bottle was placed in an agitating water bath held at a temperature of 80° C. for 30 minutes. The polymer was quenched with isopropanol to provide an unmodified polymer sample. The polymer was coagulated in 8 L isopropanol containing 15 g of 2,6-di-tert-butyl-4-methylphenol. The coagulated polymer was drum-dried. The yield of the polymer was 51.1 g (102.2% conversion). The resulting polymer had the following properties: $ML_{1+4}$: 38.5, $M_n$: 93,000 g/mole, $M_w$: 305,000 g/mole, $M_w/M_n$: 3.3, cis-1,4-linkage: 96.9%, trans-1,4-linkage: 2.2%, and 1,2-linkage: 0.9%.

Comparative Example 2

A bottle of polymer cement was prepared as in Comparative Example 1. To the bottle was added 8.50 mL of a 1.00 M solution of $Octyl(EtO)_3Si$ in toluene (100 equiv. per Nd). The bottle was placed in an agitating water bath held at a temperature of 65° C. for 30 minutes. The polymer was quenched with isopropanol. The polymer was coagulated in 8 L isopropanol containing 15 g of 2,6-di-tert-butyl-4-methylphenol. The coagulated polymer was drum-dried. The yield of the polymer was 49.70 g. The resulting polymer had the following properties: $ML_{1+4}$: 33.2, base $M_n$: 92,000 g/mole, base $M_w$: 296,000 g/mole, $M_w/M_n$: 3.2. No higher molecular weight species was observed by GPC.

As can be seen by comparing Examples 1, 2, and 3, to the Control and Comparative Example 1, a higher molecular weight species is only observed upon the addition of $(EtO)_3SiH$. It is believed that the higher molecular weight species is the result of coupling that results from the $(EtO)_3SiH$-functionalized polymer. Further comparing Examples 1, 2, and 3, to Comparative Example 2, higher molecular weight species is not observed with the addition of $Octyl(EtO)_3Si$ in comparative Example 2, indicating that a hydrosilane is necessary for the functionalization reaction with the polymer.

Preformed Catalyst 1

A small $N_2$ purged sealed glass vessel was charged with 10.46 mL of an 2.81 M solution of MAO in toluene and 2.25 mL of a 21.4% wt. solution of butadiene in hexanes. To this mixture was added 0.57 mL of a 0.518 M solution of NdV3 in hexanes, rapidly followed by 5.99 mL of a 1.03 M solution of DIBAH in hexanes. The mixture was vigorously shaken and allowed to age at 23° C. for 2 minutes. To this mixture was added 1.10 mL of a 1.07 M solution of DEAC in hexanes. After this mixture was aged at 23° C. for 14 minutes, the active catalyst mixture was diluted with 3.06 mL of toluene. The catalyst was used to prepare Control 2 and Examples 4-7.

Control 2

Two $N_2$ purged sealed glass vessels were charged with 117.8 g of hexanes followed by 232.2 g of a 21.1% wt. solution of butadiene in hexanes. To each vessel was added 3.06 mL of Preformed Catalyst 1 described above. The vessels were then immediately placed in an agitating bath at 65° C. After 60 minutes of agitation, the vessels were removed from the bath and terminated with 4 mL of isopropyl alcohol containing 0.46 g of 2,6-di-tert-butyl-4-methylphenol. The polymer cement was combined and coagulated in 8 L isopropyl alcohol containing 15 g of 2,6-di-tert-butyl-4-methylphenol and then drum dried. The yield of the polymer was 98.4 g. The resulting polymer had the following properties: $ML_{1+4}$: 33.7, base $M_n$: 123,000 g/mole, base $M_w$: 247,000 g/mole, $M_w/M_n$: 2.0, cis-1,4-linkage: 94.6%, trans-1,4-linkage: 4.8%, and 1,2-linkage: 0.6%.

Example 4

Two $N_2$ purged sealed glass vessels were charged with 117.8 g of hexanes followed by 232.2 g of a 21.1% wt. solution of butadiene in hexanes. To each vessel was added 3.06 mL of Preformed Catalyst 1 described above. The vessels were then immediately placed in an agitating bath at 65° C. After 60 minutes of agitation, the vessels were removed from the bath and 1.54 mL of triethoxysilane was added to each vessel. The bottles were then placed in an agitating bath at 80° C. After 60 minutes the vessels were removed from the bath and terminated with 4 mL of isopropyl alcohol containing 0.46 g of 2,6-di-tert-butyl-4-methylphenol. The polymer cement was combined and coagulated in 8 L isopropyl alcohol containing 15 g of 2,6-di-tert-butyl-4-methylphenol and then drum dried. The yield of the polymer was 97.7 g. The resulting polymer had the following properties: $ML_{1+4}$: 33.8, base $M_n$: 128,000 g/mole, base $M_w$: 224,000 g/mole, $M_w/M_n$: 2.0, cis-1,4-linkage: 94.7%, trans-1,4-linkage: 4.8%, and 1,2-linkage: 0.5%. In addition there was a higher molecular weight species present with an $M_n$ of approximately 11,000,000 which constituted 1.7% of the polymer.

Example 5

Two $N_2$ purged sealed glass vessels were charged with 117.8 g of hexanes followed by 232.2 g of a 21.1% wt.

solution of butadiene in hexanes. To each vessel was added 3.06 mL of Preformed Catalyst 1 described above. The vessels were then immediately placed in an agitating bath at 65° C. After 60 minutes of agitation, the vessels were removed from the bath and 2.11 mL of 1,1,3,3,5,5,-hexamethyltrisiloxane was added to each vessel. The bottles were then placed in an agitating bath at 80° C. After 60 minutes the vessels were removed from the bath and terminated with 4 mL of isopropyl alcohol containing 0.46 g of 2,6-di-tert-butyl-4-methylphenol. The polymer cement was combined and coagulated in 8 L isopropyl alcohol containing 15 g of 2,6-di-tert-butyl-4-methylphenol and then drum dried. The yield of the polymer was 97.6 g. The resulting polymer had the following properties: $ML_{1+4}$: 31.4, base $M_n$: 119,000 g/mole, base $M_w$: 241,000 g/mole, $M_w/M_n$: 2.0, cis-1,4-linkage: 94.5%, trans-1,4-linkage: 4.9%, and 1,2-linkage: 0.6%.

Example 6

Two $N_2$ purged sealed glass vessels were charged with 117.8 g of hexanes followed by 232.2 g of a 21.1% wt. solution of butadiene in hexanes. To each vessel was added 3.06 mL of Preformed Catalyst 1 described above. The vessels were then immediately placed in an agitating bath at 65° C. After 60 minutes of agitation, the vessels were removed from the bath and 2.26 mL of 1,1,1,3,3,5,5,-heptamethyltrisiloxane was added to each vessel. The bottles were then placed in an agitating bath at 80° C. After 60 minutes the vessels were removed from the bath and terminated with 4 mL of isopropyl alcohol containing 0.46 g of 2,6-di-tert-butyl-4-methylphenol. The polymer cement was combined and coagulated in 8 L isopropyl alcohol containing 15 g of 2,6-di-tert-butyl-4-methylphenol and then drum dried. The yield of the polymer was 97.7 g. The resulting polymer had the following properties: $ML_{1+4}$: 30.5, base $M_n$: 123,000 g/mole, base $M_w$: 236,000 g/mole, $M_w/M_n$: 1.9, cis-1,4-linkage: 94.5%, trans-1,4-linkage: 4.9%, and 1,2-linkage: 0.6%.

Example 7

Two $N_2$ purged sealed glass vessels were charged with 117.8 g of hexanes followed by 232.2 g of a 21.1% wt. solution of butadiene in hexanes. To each vessel was added 3.06 mL of Preformed Catalyst 1 described above. The vessels were then immediately placed in an agitating bath at 65° C. After 60 minutes of agitation, the vessels were removed from the bath and 3.04 mL of 1,1,3,3,5,5,-hexamethyltrisiloxane was added to each vessel. The bottles were then placed in an agitating bath at 80° C. After 60 minutes the vessels were removed from the bath and terminated with 4 mL of isopropyl alcohol containing 0.46 g of 2,6-di-tert-butyl-4-methylphenol. The polymer cement was combined and coagulated in 8 L isopropyl alcohol containing 15 g of 2,6-di-tert-butyl-4-methylphenol and then drum dried. The yield of the polymer was 98.3 g. The resulting polymer had the following properties: $ML_{1+4}$: 48.7, base $M_n$: 137,000 g/mole, base $M_w$: 248,000 g/mole, $M_w/M_n$: 1.8, cis-1,4-linkage: 94.9%, trans-1,4-linkage: 4.9%, and 1,2-linkage: 0.6%. In addition there was a higher molecular weight species present with an $M_n$ of approximately 23,000,000 which constituted 4.8% of the polymer.

TABLE 1

Compound Formulation

| | Amount (phr) |
|---|---|
| Masterbatch | |
| Synthetic polymer | 80 |
| Natural Rubber | 20 |
| Black oil | 10 |
| Silica | 55 |
| 60% disulfide silane | 4.4 |
| Stearic acid | 2 |
| 6-PPD | 1 |
| Wax | 2 |
| Final | |
| Zinc Oxide | 2.5 |
| DPG | 1.4 |
| MBTS | 0.6 |
| TBBS | 1.5 |
| Sulfur | 1.5 |
| TOTAL | 181.9 |

Testing data in the Examples was performed on vulcanizates, which were cured for ~15 minutes at 160° C. The compounds from which these vulcanizates were prepared were made according to the formulations shown above in Table 1 where N-phenyl-N'-(1,3-dimethylbutyl)-p-phenylenediamine (6-PPD) acts as an antioxidant and 2,2'-dithiobis(benzothiazole) (MBTS), N-tert-butylbenzothiazole-2-sulfenamide (TBBS) and N,N'-diphenylguanidine (DPG) act as accelerators. Black oil is an extender oil that contains a relatively low amount of polycyclic aromatic (PCA) compounds.

Using the formulation from Table 1 above, vulcanizable elastormeric compounds containing reinforcing fillers were prepared from Controls 1 and 2 and Examples 1-7. Results of physical testing on these compounds are shown below in Table 2 and 3. Tensile mechanical properties were determined using the standard procedure described in ASTM-D412; Payne effect (ΔG', i.e., the difference between G' at 0.25% strain and at 14% strain) and hysteresis (tan δ) data were obtained from dynamic experiments conducted at 60° C. and 10 Hz (strain sweep). With respect to tensile properties, Mx is modulus at x % elongation.

TABLE 2

Testing Data for Control 1 and Examples 1-3

| | Control 1 | Example 1 | Example 2 | Example 3 |
|---|---|---|---|---|
| M50 (MPa) | 1.62 | 1.68 | 1.65 | 1.66 |
| M300 (MPa) | 8.16 | 9.52 | 8.97 | 9.32 |
| ΔG' (MPa) | 4.618 | 3.450 | 3.108 | 2.905 |

TABLE 3

Testing Data for Control 2 and Examples 4-7

| | Control 2 | Example 4 | Example 5 | Example 6 | Example 7 |
|---|---|---|---|---|---|
| M50 (MPa) | 2.01 | 2.05 | 2.06 | 2.05 | 2.05 |
| M300 (MPa) | 10.08 | 10.72 | 10.51 | 10.67 | 11.50 |
| ΔG' (MPa) | 4.673 | 4.088 | 4.688 | 4.062 | 3.312 |

From the data in Tables 2 and 3, one can see that compounds made with the hydrosilane modified polymer (Examples 1-7) can exhibit improved Payne effect (reduced ΔG') compared to non-modified polymer (Controls 1 & 2).

Various modifications and alterations that do not depart from the scope and spirit of this invention will become apparent to those skilled in the art. This invention is not to be duly limited to the illustrative embodiments set forth herein.

What is claimed is:

1. A method of preparing a silane-functionalized polymer, the method comprising
combining:
   (i) a cis-1,4-polydiene,
   (ii) a hydrosilane compound, and
   (iii) a lanthanide-based catalyst; and
allowing the cis-1,4-polydiene to react with the hydrosilane compound to form the silane-functionalized polymer.

2. The method of claim 1, wherein the step of combining includes:
   (i) preparing a polymerization system including the cis-1,4-polydiene by introducing the lanthanide-based catalyst and a conjugated diene monomer; and
   (ii) adding the hydrosilane compound to the polymerization system including the cis-1,4-polydiene.

3. The method of claim 2, where the lanthanide-based catalyst includes (a) a lanthanide-containing compound, (b) an alkylating agent, and (c) a halogen source.

4. The method of claim 2, further comprising the step of chain-end functionalizing the cis-1,4-polydiene by reacting a cis-1,4-polydiene having a reactive chain end with a secondary-functionalizing agent.

5. The method of claim 2, where no additional catalyst is added prior to the step of adding the hydrosilane compound to the polymerization system including the cis-1,4-polydiene.

6. The method of claim 2, where the hydrosilane compound is defined by the formula I

where x is an integer from 1 to 4, and each R is independently a halogen atom, or a monovalent organic group, or where two or more R groups may join to form a polyvalent organic group.

7. The method of claim 2, where the hydrosilane compound is defined by the formula II

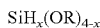

where x is an integer from 1 to 4, and each R is individually a hydrocarbyl or silyl group, or where two or more R groups join to form a polyvalent organic group.

8. The method of claim 2, where the hydrosilane compound is defined by the formula III

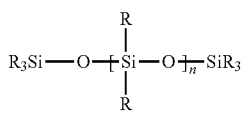

where n is an integer from 0 to 8, and each R is individually a hydrogen atom, halogen atom, or a hydrocarbyl group, or where two or more R groups join to form a polyvalent organic group, with the proviso that at least one R in the hydrosilane compound is a hydrogen atom.

9. The method of claim 2, where the hydrosilane compound is defined by the formula IV

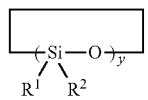

where $R^1$ and $R^2$ are each individually a hydrogen atom, halogen atom, or a monovalent organic group, with the proviso that the at least one $R^1$ or $R^2$ in the hydrosilane compound is a hydrogen atom, and y is from about 3 to about 6 units.

10. The method of claim 2, where the hydrosilane compound is selected from the group consisting of trihydrocarbyloxy silane, hydrocarbyl dihydrocarbyloxy silane, dihydrocarbyl hydrocarbyloxy silane, trisilyloxy silane, hydrocarbyl disilyloxy silane, dihydrocarbyl silyloxy silane, and cyclic hydrosilane compounds.

11. The method of claim 2, where the cis-1,4-polydiene has a 1,2-linkage content of from about 0.1 to about 7%, a cis-1,4-linkage content that is greater than 60%, and a number average molecular weight of from about 1,000 to about 1,000,000.

12. The method of claim 1, further comprising combining the silane-functionalized polymer with a filler and a curative to thereby form a vulcanizable composition.

13. The method of claim 1, where the hydrosilane compound is defined by the formula I

where x is an integer from 1 to 4, and each R is independently a halogen atom, or a monovalent organic group, or where two or more R groups may join to form a polyvalent organic group.

14. The method of claim 1, where the hydrosilane compound is defined by the formula II

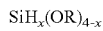

where x is an integer from 1 to 4, and each R is individually a hydrocarbyl or silyl group, or where two or more R groups join to form a polyvalent organic group.

15. The method of claim 1, where the hydrosilane compound is defined by the formula III

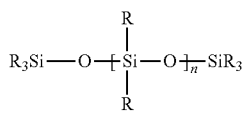

where n is an integer from 0 to 8, and each R is individually a hydrogen atom, halogen atom, or a monovalent organic group, or where two or more R groups join to form a polyvalent organic group, with the proviso that at least one R in the hydrosilane compound is a hydrogen atom.

16. The method of claim 1, where the hydrosilane compound is defined by the formula IV

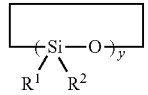

where $R^1$ and $R^2$ are each individually a hydrogen atom, halogen atom, or a monovalent organic group, with the proviso that the at least one $R^1$ or $R^2$ in the hydrosilane compound is a hydrogen atom, and y is from about 3 to about 6 units.

17. The method of claim 1, where the cis-1,4-polydiene has a 1,2-linkage content of from about 0.1 to about 7%.

18. The method of claim 1, where the cis-1,4-polydiene includes a secondary-functional group.

19. The method of claim 2, further comprising combining the silane-functionalized polymer with a filler and a curative to thereby form a vulcanizable composition.

20. The method of claim 12, further comprising vulcanizing the vulcanizable composition to thereby form a tire component.

* * * * *